Sept. 1, 1970 R. A. RAGEN 3,526,760
SQUARE ROOT CALCULATOR EMPLOYING A MODIFIED
SUM OF THE ODD INTEGERS METHOD
Filed April 1, 1966 19 Sheets-Sheet 1
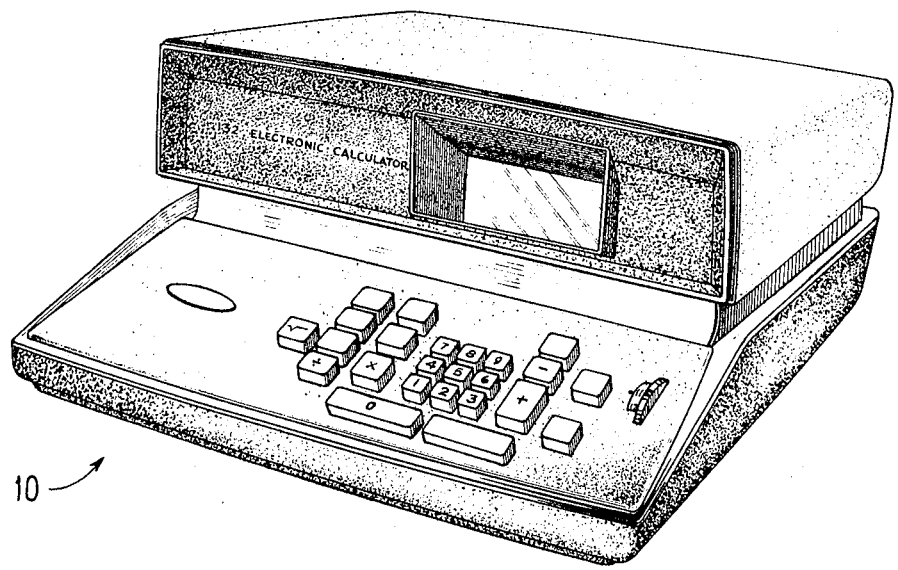
FIG_1
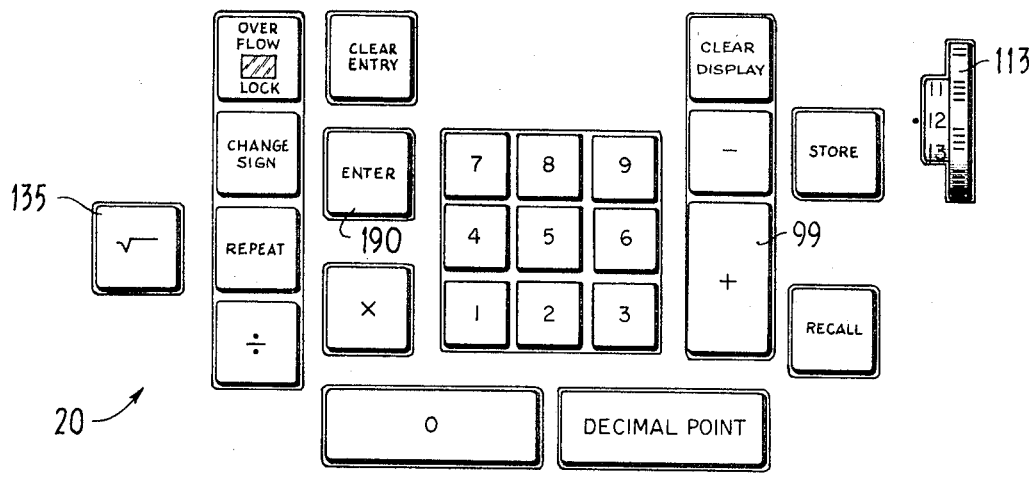
FIG_2
ROBERT A. RAGEN
INVENTOR.
BY Pat J. Schlesinger
ATTORNEY

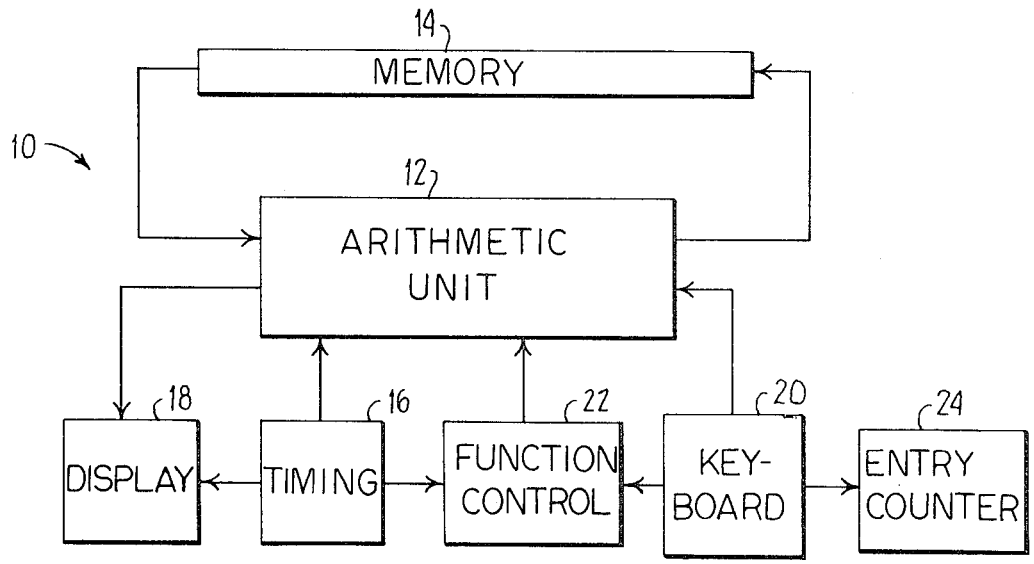
FIG_3
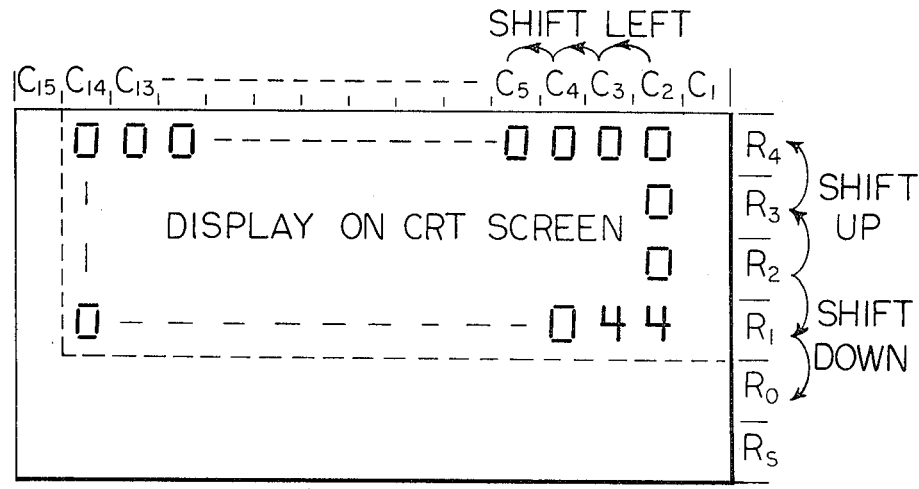
FIG_4
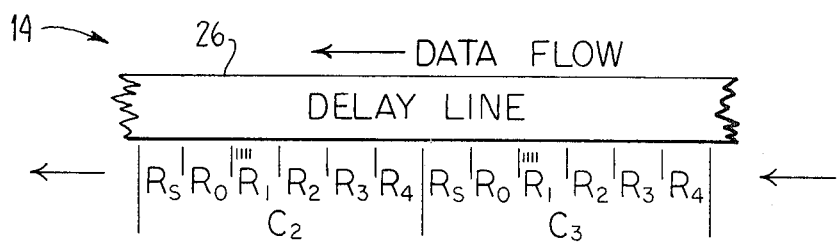
FIG_5

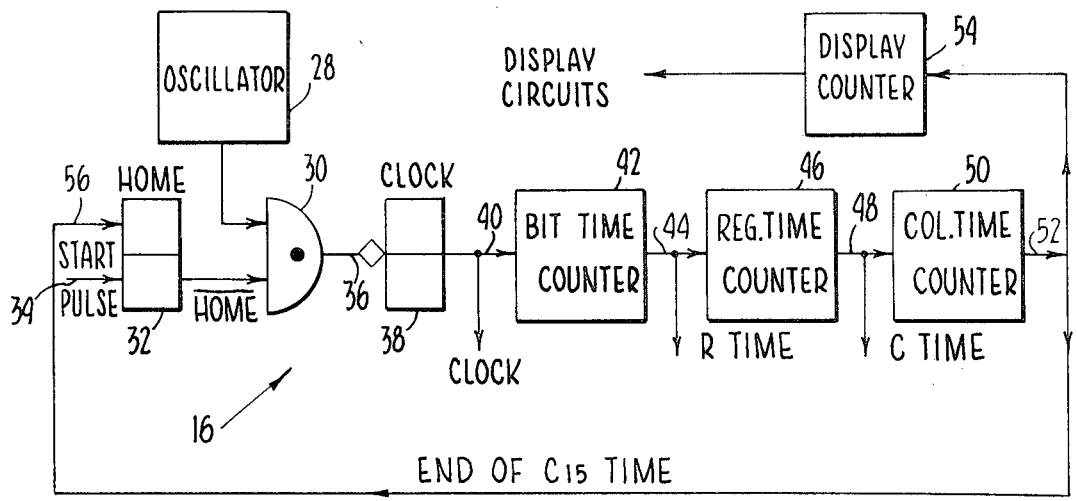
FIG_6
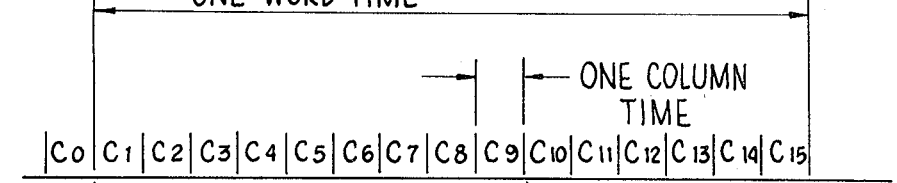
FIG_7

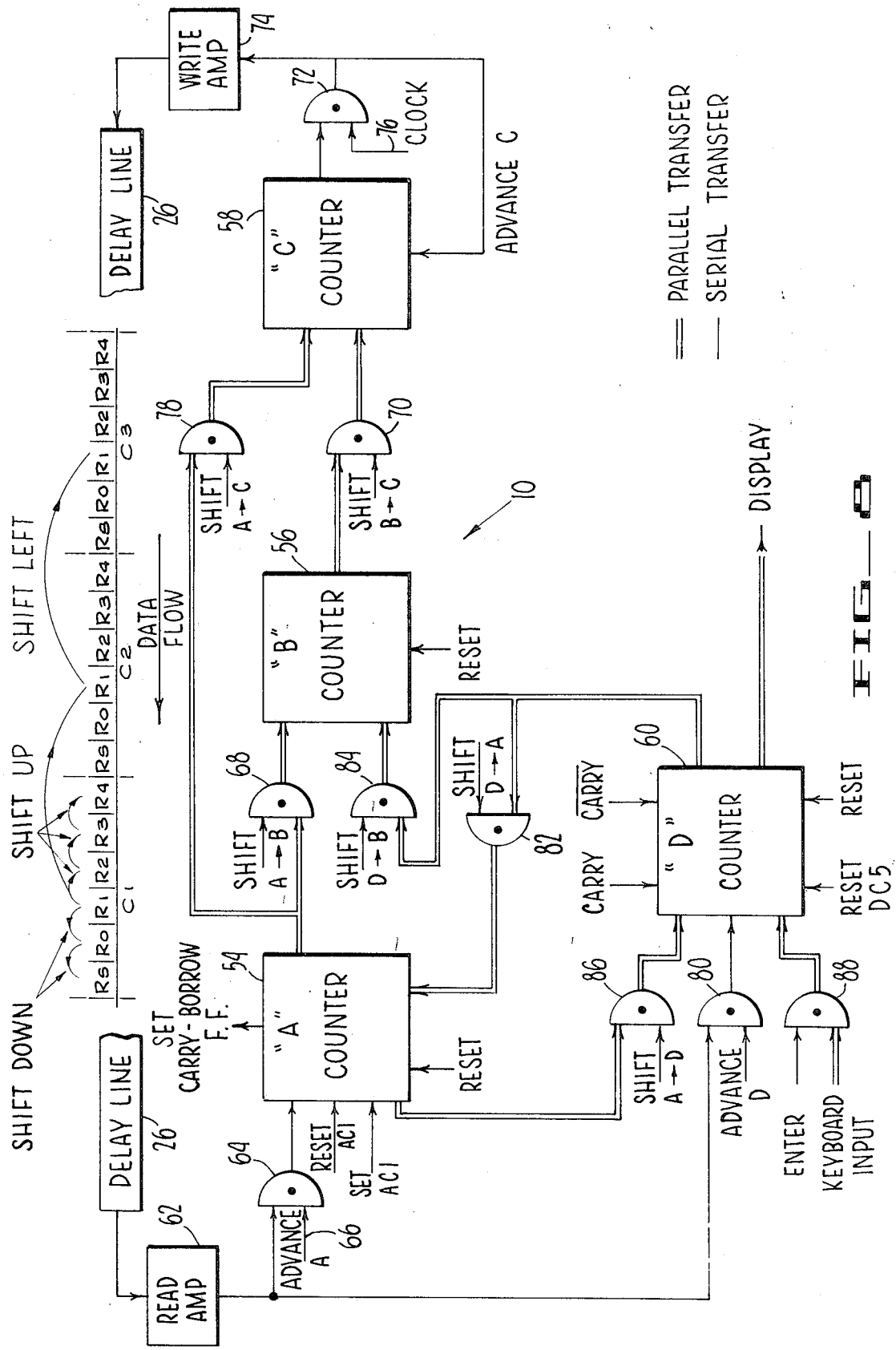

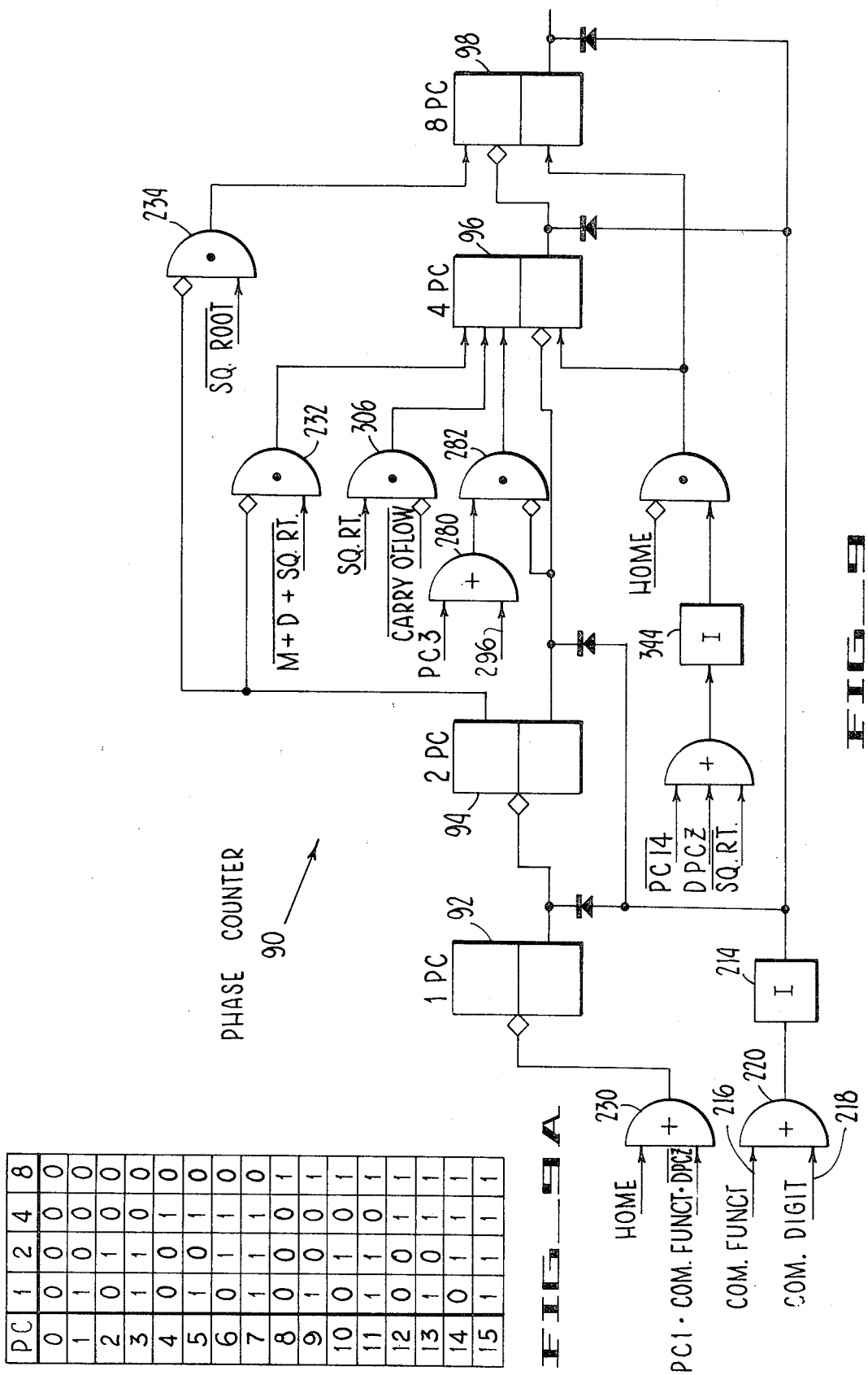

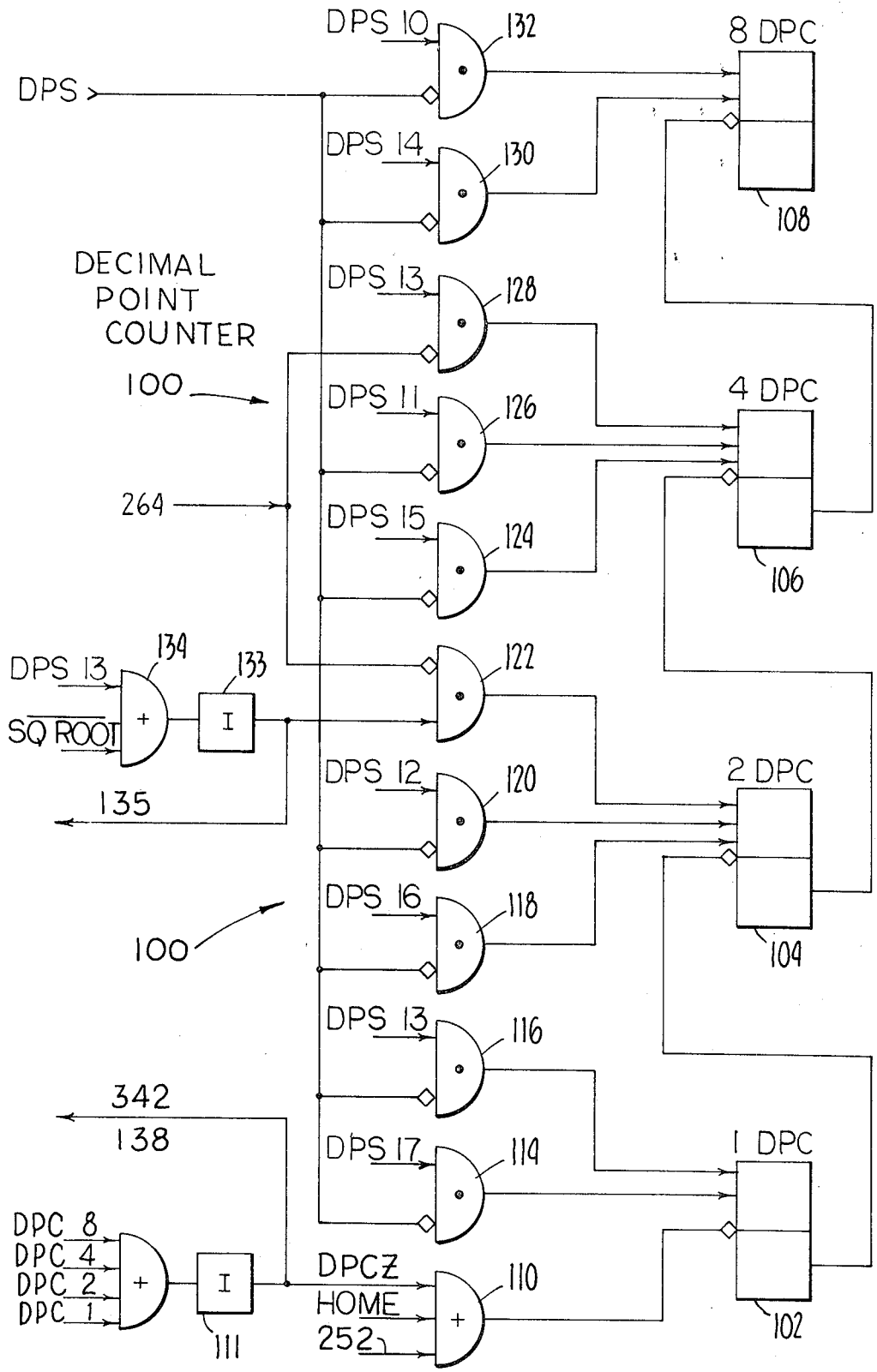
FIG_10

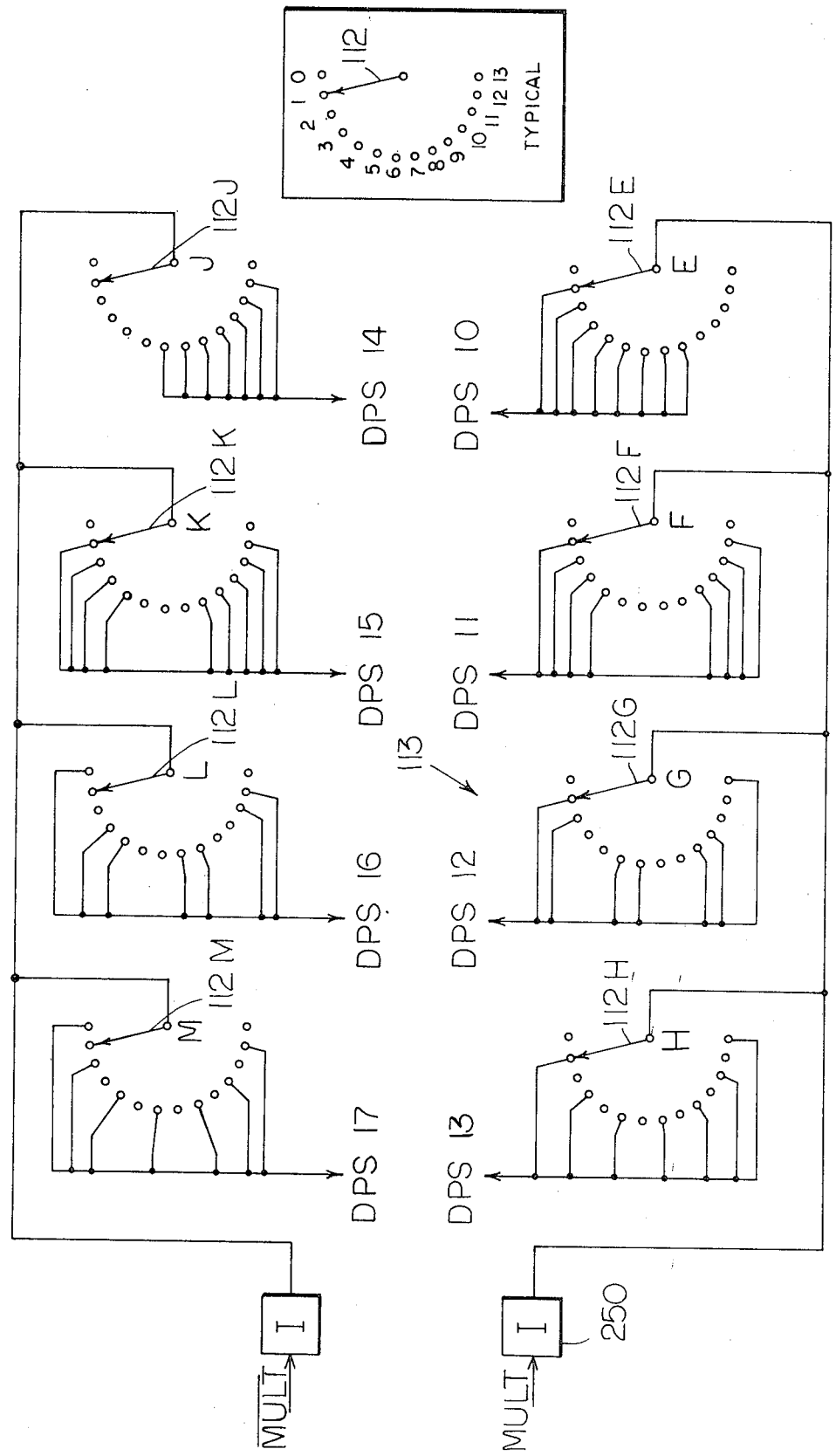
FIG_11

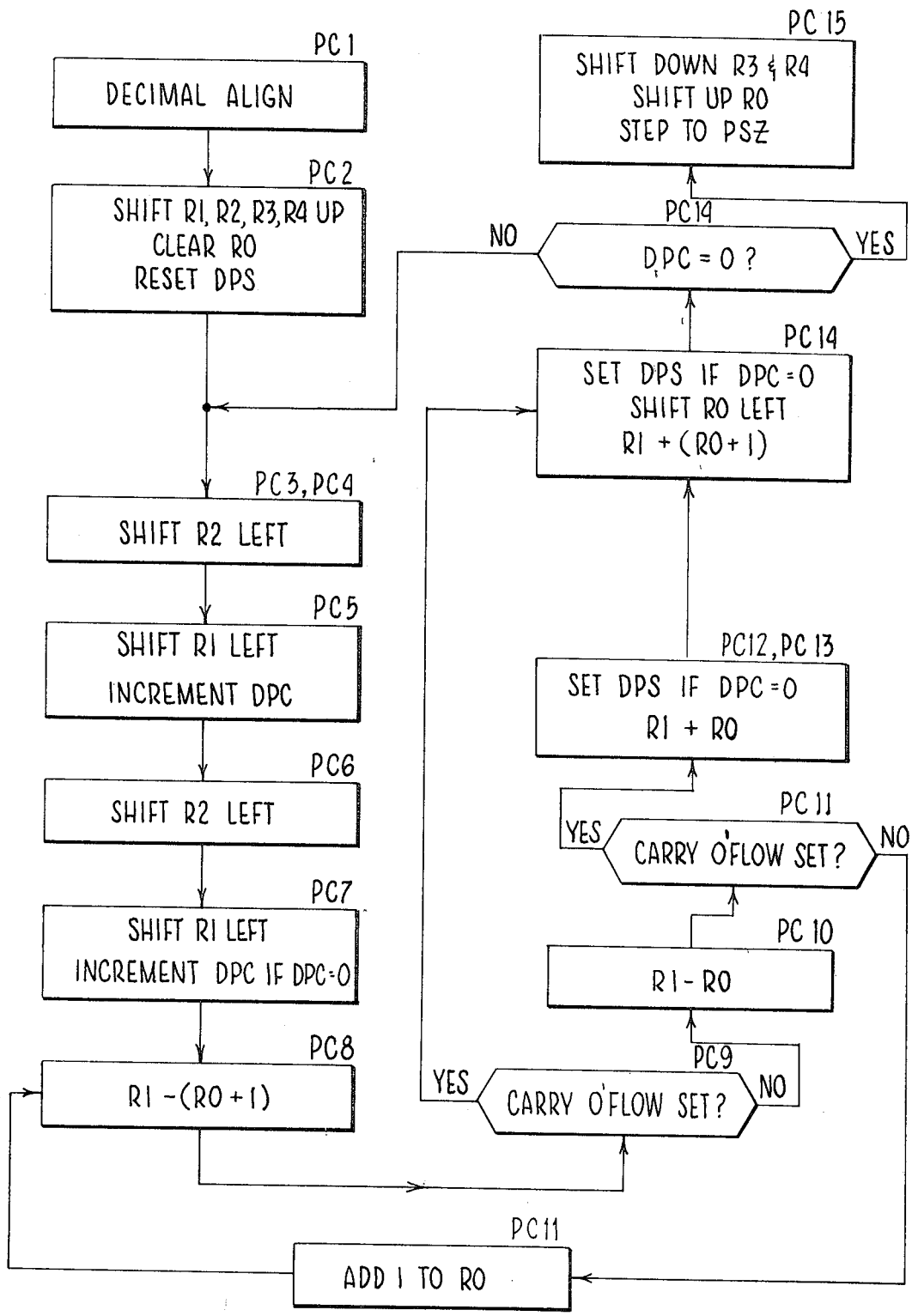
FIG_12

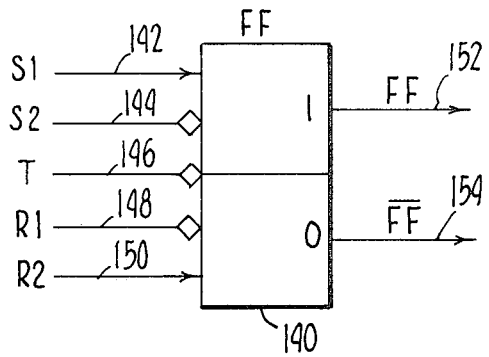
FIG_13
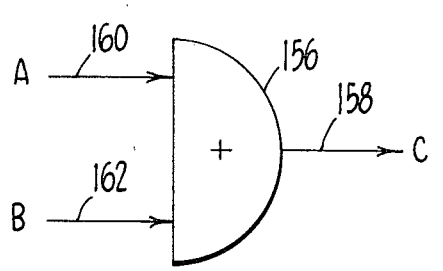
FIG_14
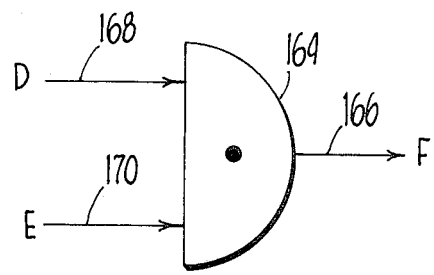
FIG_15
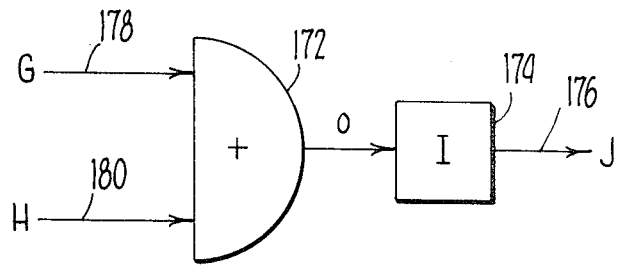
FIG_16
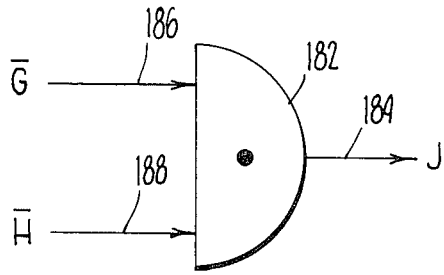
FIG_17

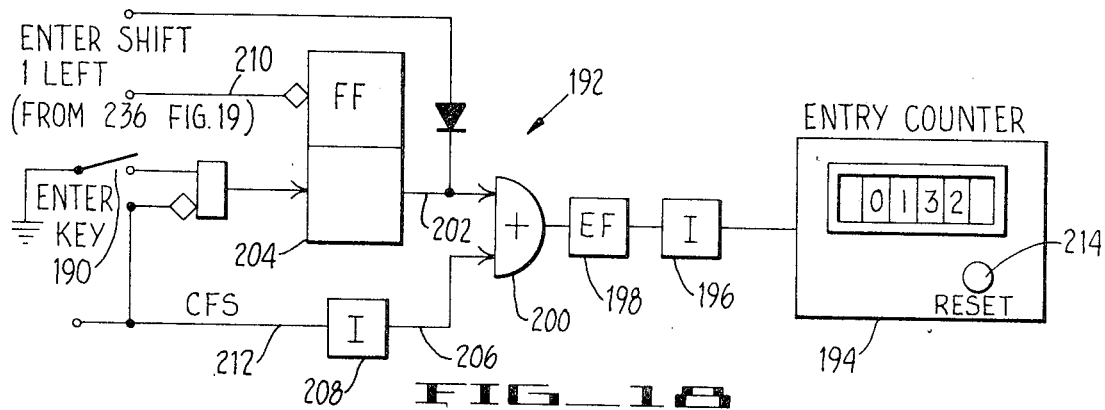
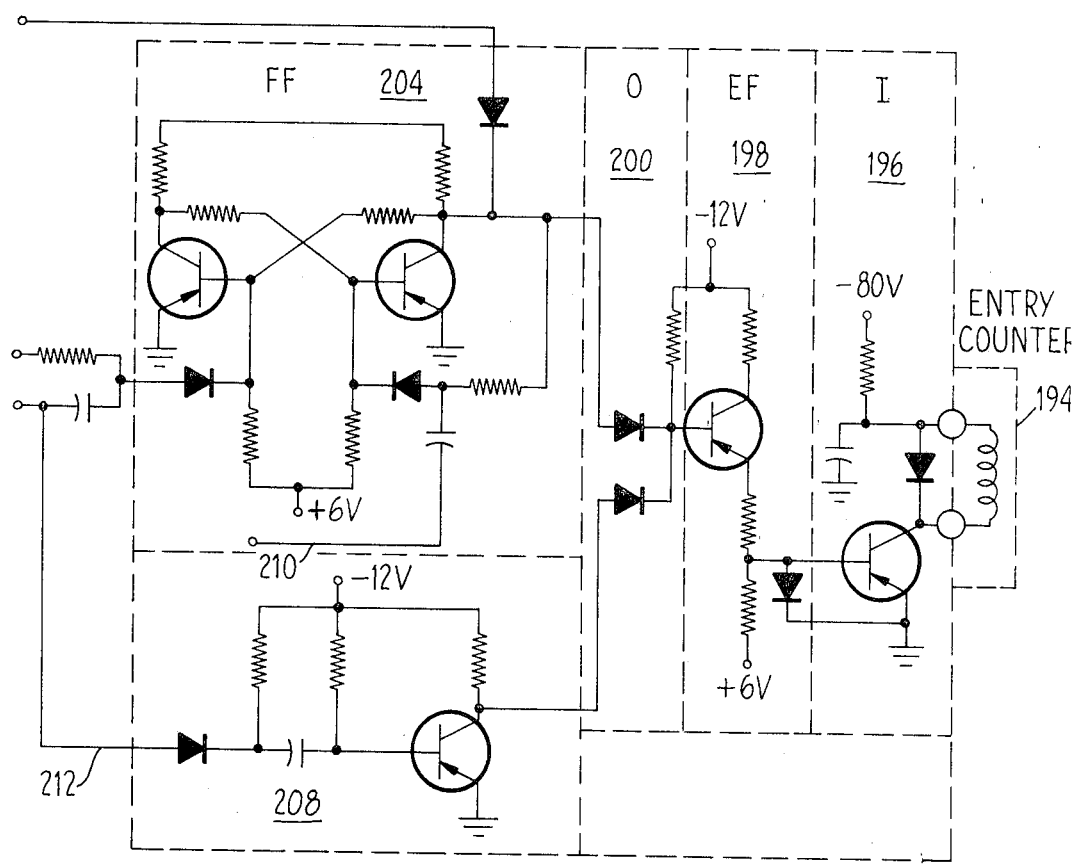

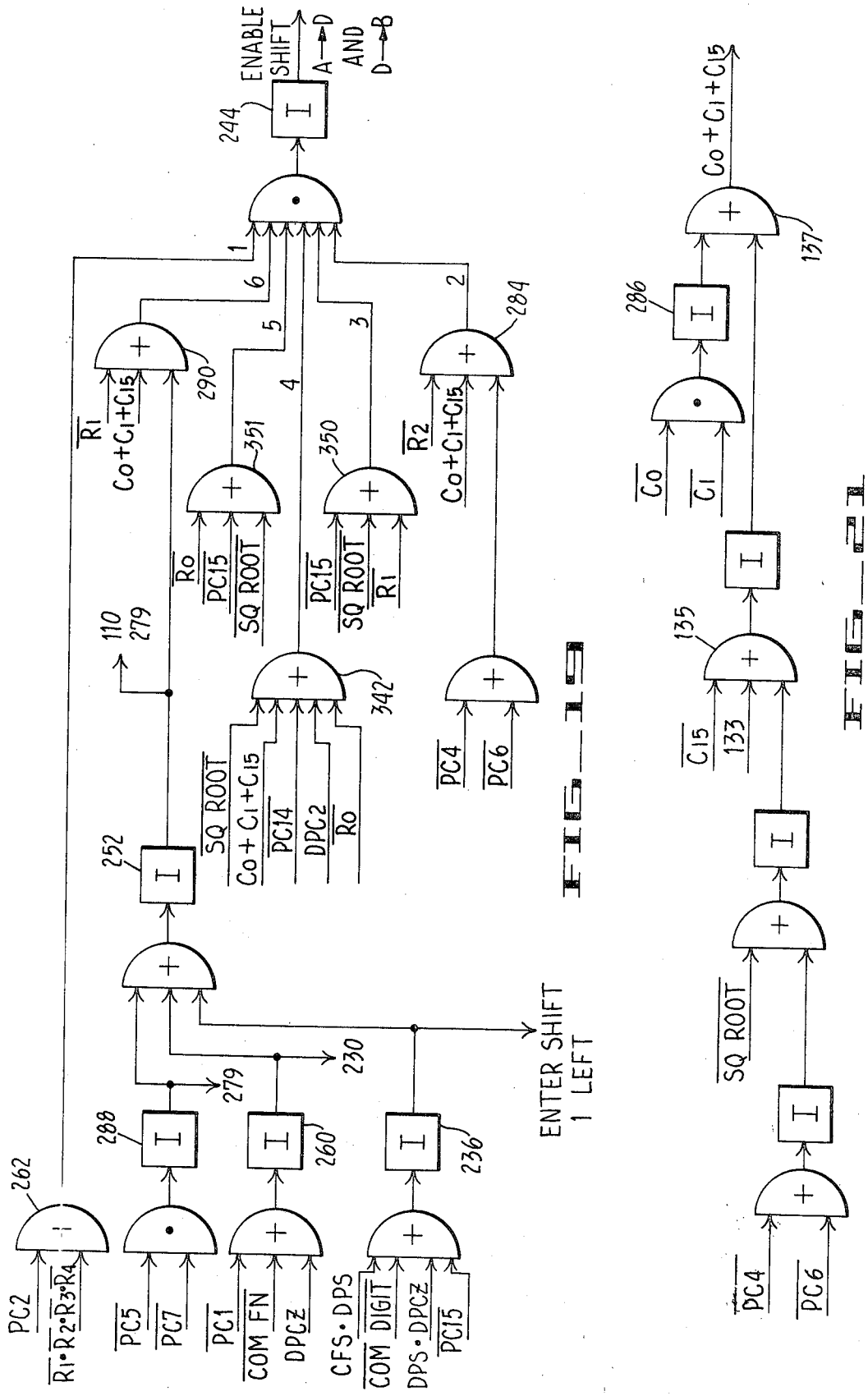

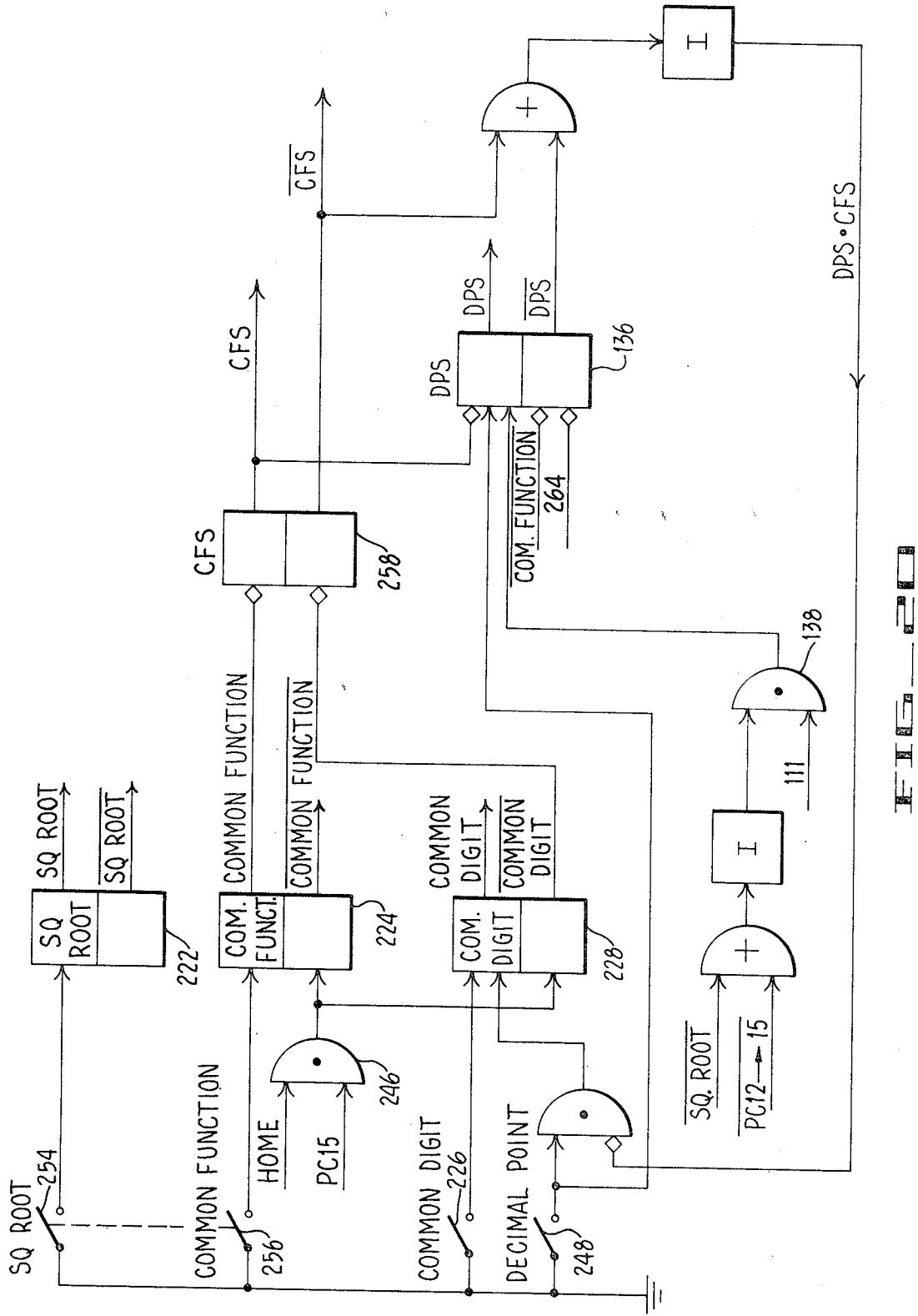

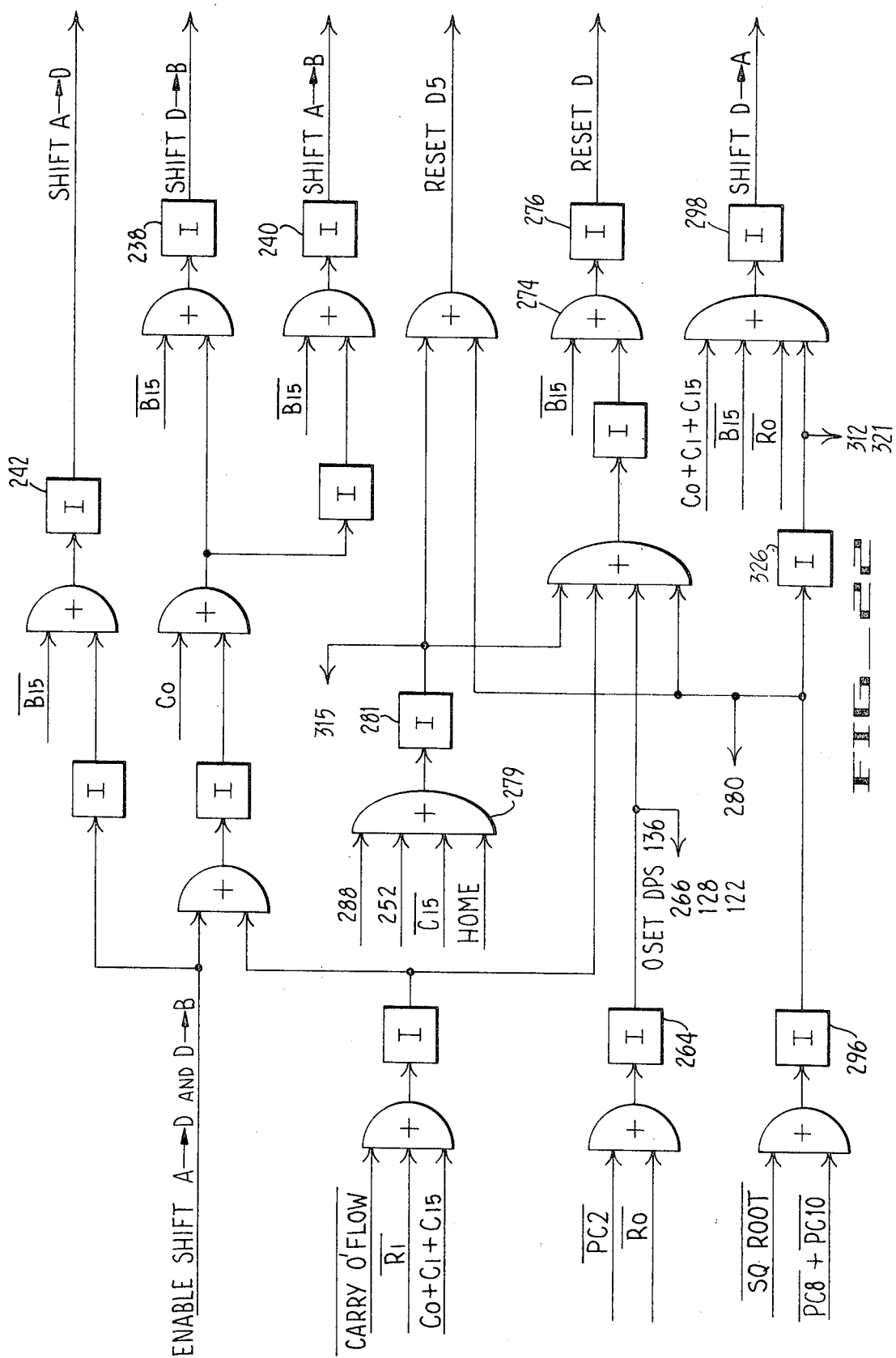

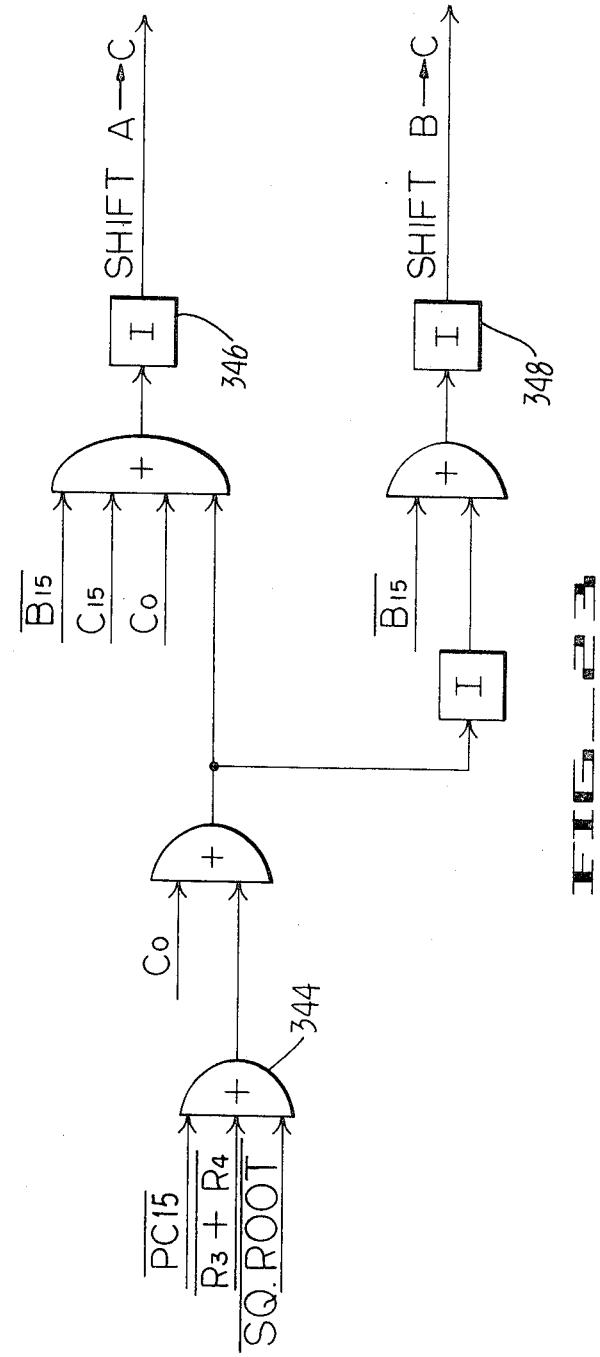

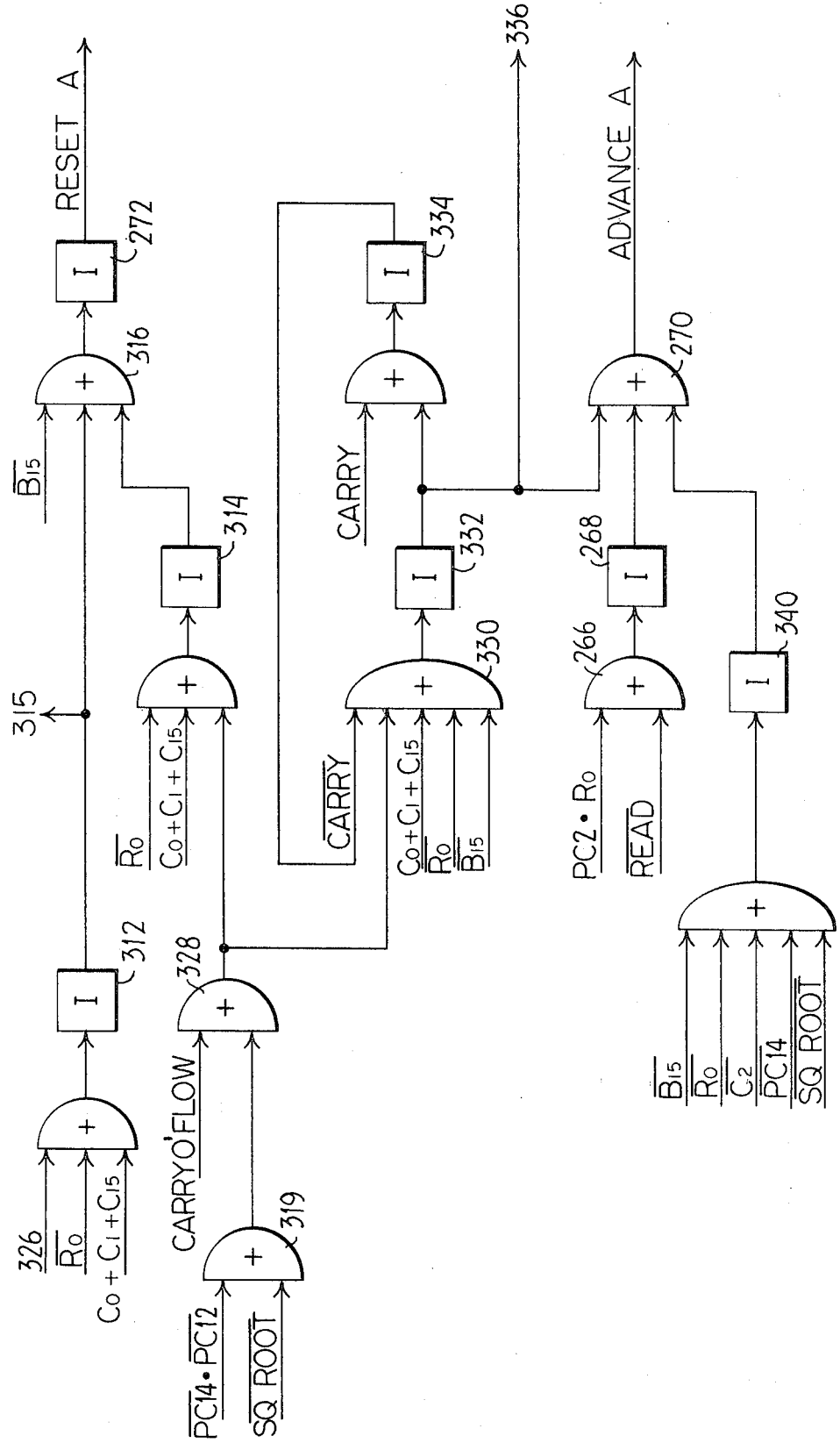

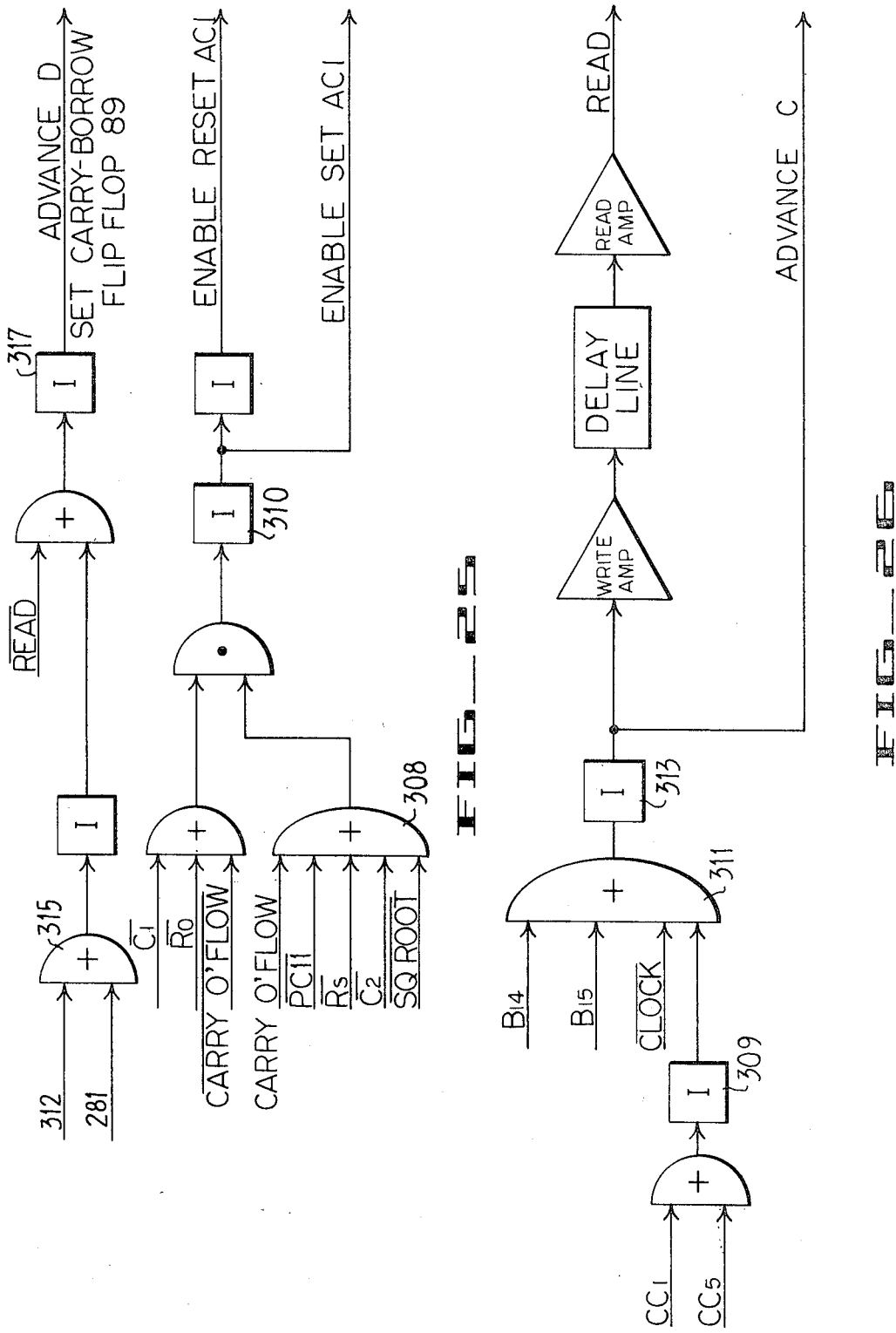

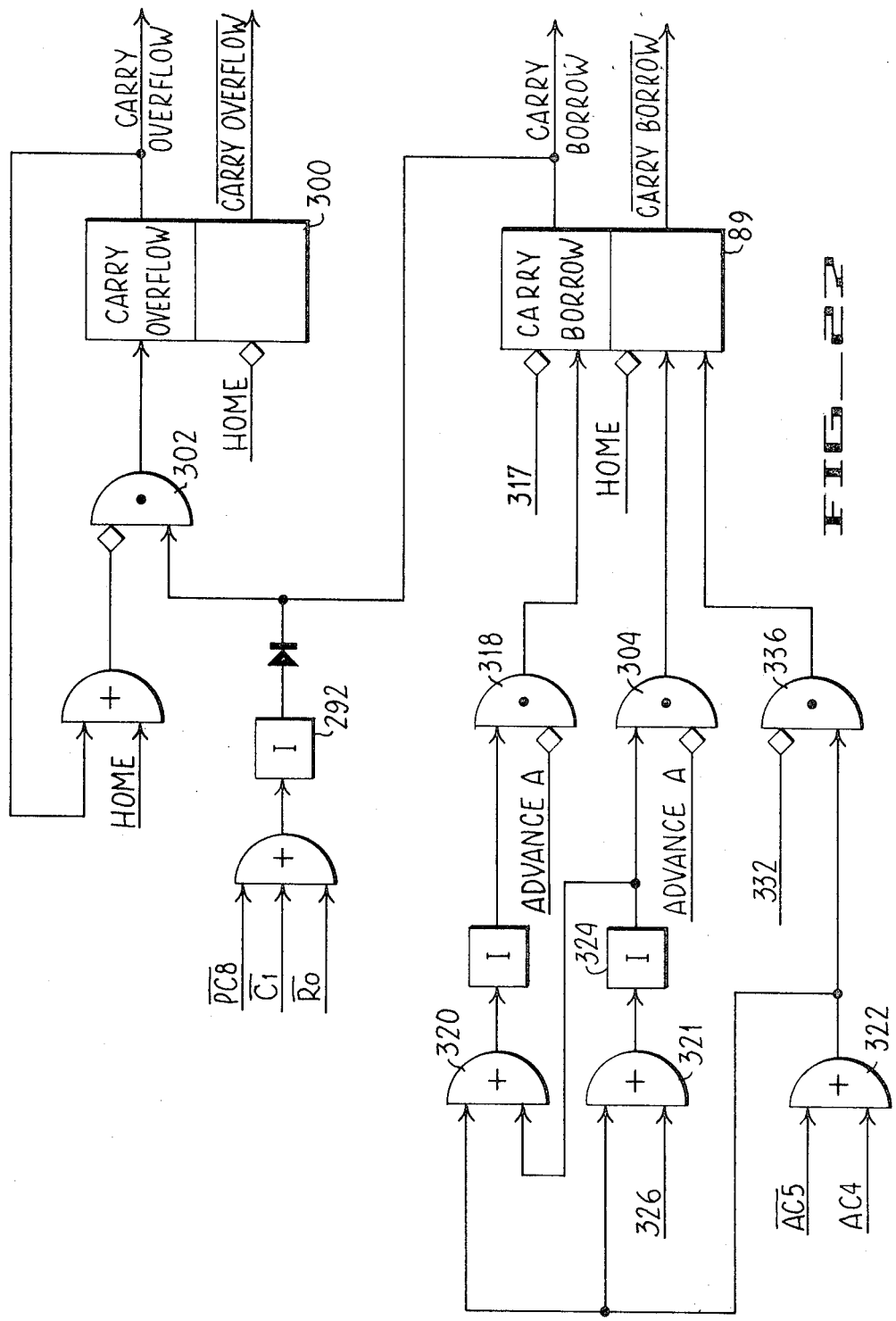
FIG_27

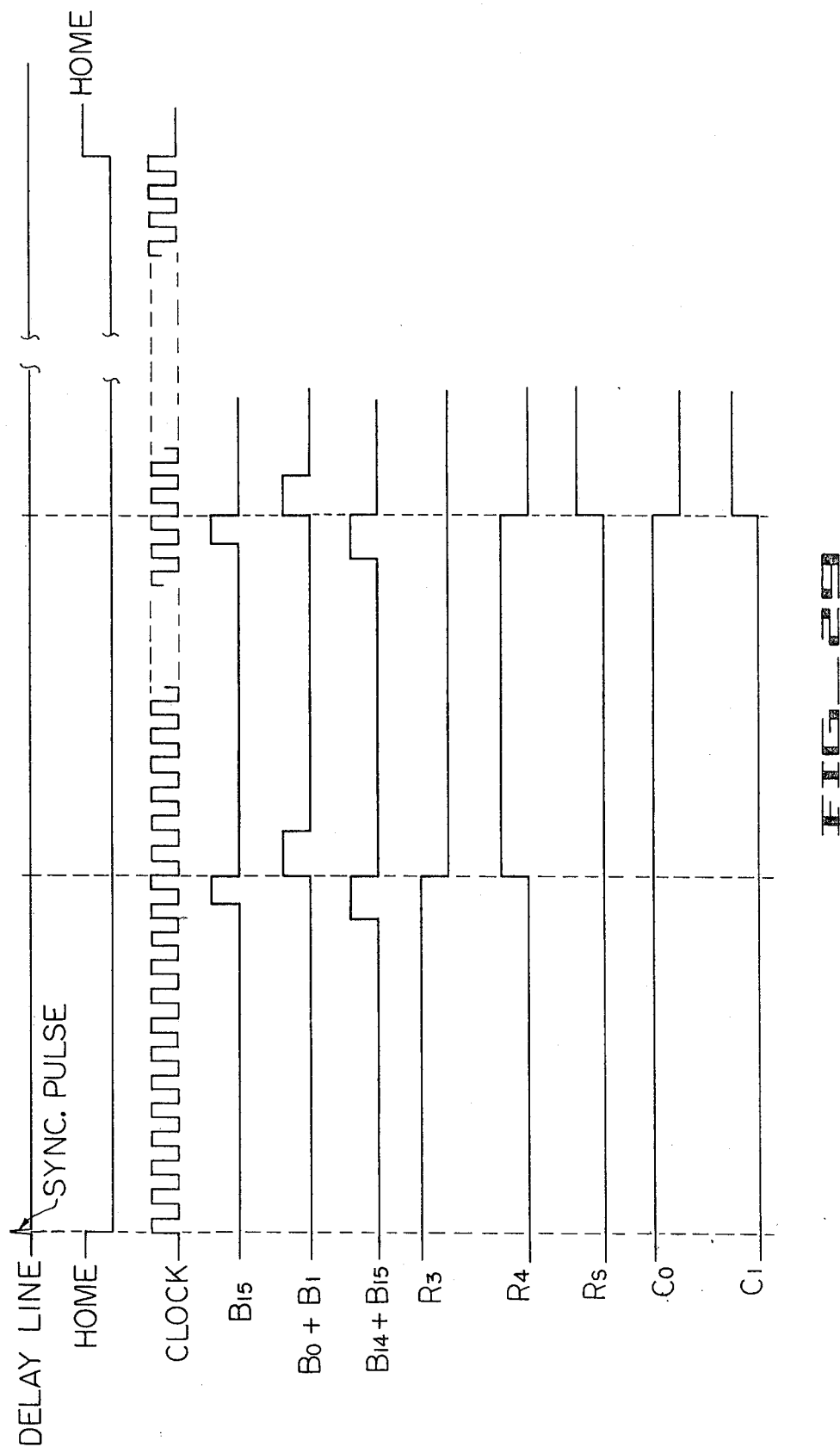

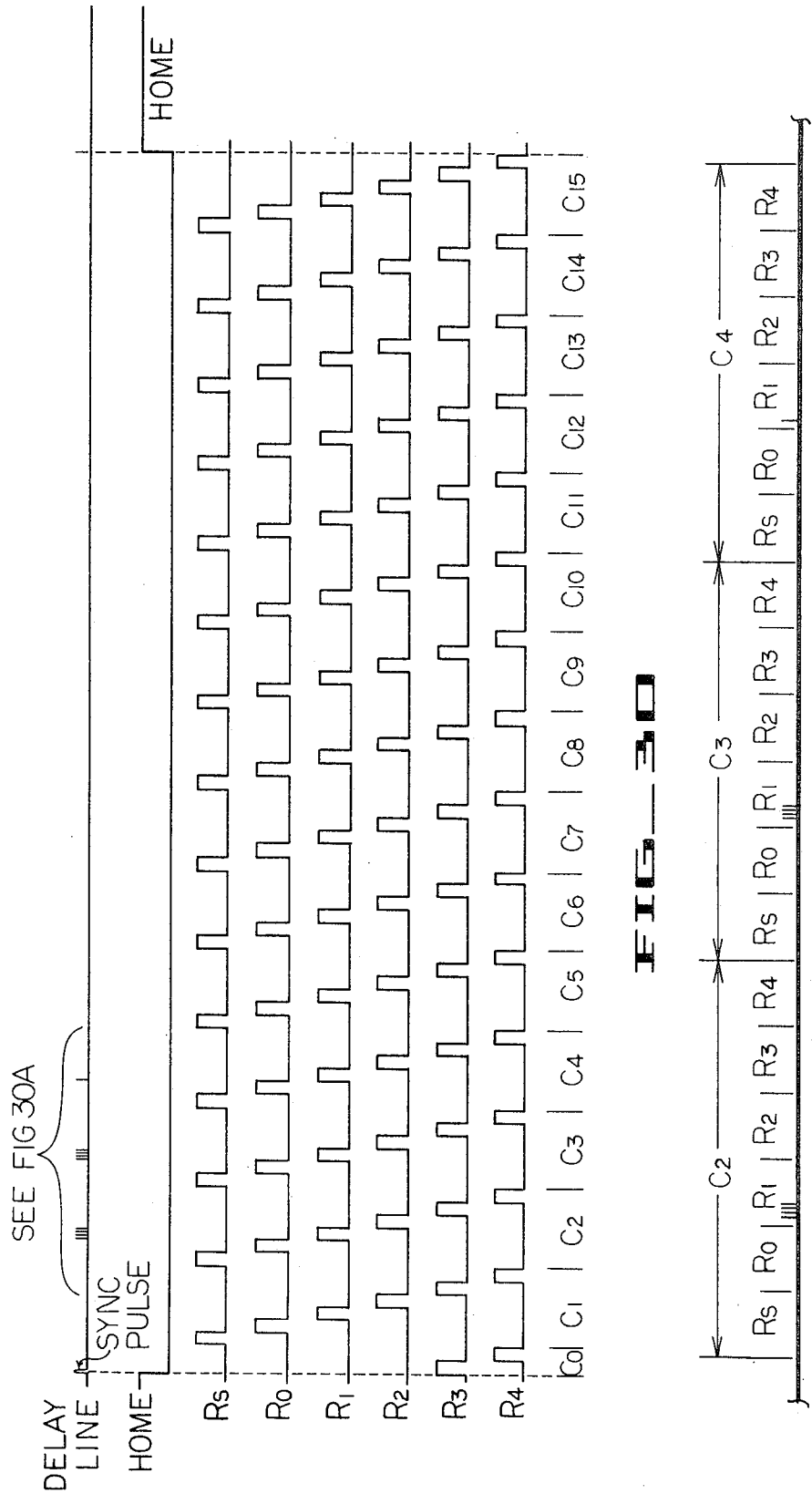

United States Patent Office 3,526,760
Patented Sept. 1, 1970

3,526,760
SQUARE ROOT CALCULATOR EMPLOYING A MODIFIED SUM OF THE ODD INTEGERS METHOD
Robert A. Ragen, Hayward, Calif., assignor, by mesne assignments, to The Singer Company, a corporation of New Jersey
Filed Apr. 1, 1966, Ser. No. 539,569
Int. Cl. G06f 7/48
U.S. Cl. 235—158                                18 Claims

ABSTRACT OF THE DISCLOSURE

A calculator is disclosed for deriving the square root of an operand according to a modified sum of the odd integers method. The square root is obtained by arranging the operand in consecutive pairs of contiguous digits and performing a plurality of series of successive substractions on several partial operands. Each partial operand comprises a pair of digits arranged to the right of the last non-negative remainder from the previous series of subtractions. Circuitry is provided for decimally aligning the entered operand and the derived square root in accordance with the number of digits desired to the right of the decimal point.

---

This invention relates to improvements in electronic calculators and more particularly, but not by way of limitation, to an electronic calculator which simply and quickly derives the square root of a number, the square root being correctly decimally aligned. The invention also provides for the cumulative counting of the entry of each complete number into the calculator.

Electronic computers with the capability of extracting the square root of an operand are known in the art, and have provided a significant improvement in the operation of numbers over mechanical calculating machines. There are digital computers, presently known in the art, which provide highly accurate and extremely fast calculations. By utilizing sophisticated circuitry, these present digital computers can be adapted to derive the square root of a number. However, due to the extraordinary speed requirements of these machines, this added capability results in a disproportionate increase in cost.

In the presently emerging market for deck-top digital computers and electronic calculating machines, simplicity of design and reasonableness of cost are important considerations. The cost of adapting a desk-top electronic calculator to derive a square root using present known methods would be economically prohibitive. Also, while the speed requirements of a deck-top electronic calculator are lower than that of a large digital computer, nonetheless, speed is a consideration. It is desirable in the derivation of a correct decimally aligned square root by a desk-top electronic calculator that the time required for this derivation not to differ substantially from that required for the performance of other functions of the machine such as multiplication and division.

It is also desirable for an operator of the electronic calculator to be able to easily perform a square root operation with only an absolute minimum manipulation of the keyboard. An advantage of electronic calculators over rotary mechanical calculating machines is that many arithmetic functions may be performed in a simpler manner, thereby permitting use of the machine by a relatively untrained operator. In furtherance of the objective of permitting complete operation of the calculator by an operator possessing only limited training, the square root function of the calculator must be initiated with substantially the same ease as other arithmetic functions performed by the calculator.

When a series of numbers are entered into the calculator by manipulation of the keyboard, it is considered desirable that a cumulative sum of the entries be temporarily recorded so that a running check of the computation in a problem may be maintained. This is of considerable assistance, not only to casual users of the calculator with limited experience, but also to skilled operators of calculating machines.

The novel method employed in the present invention for deriving a square root is a modified "sum of the odd integers" method. The "sum of the odd integers" method is known as a method of extracting a square root, but it is not easily adapted to digital techniques, and until the present invention, a practical manner of utilizing this method had not been known.

Odd integers are the whole numbers 1, 3, 5, 7, 9, 11, etc. If such a succession of odd integers (an odd order arithmetic progression) are added, each summation will result in a perfect square. A perfect square is, of course, a number whose square root is a whole number. This is illustrated by the following table:

(1) $1+0=1=1^2$
(2) $1+3=4=2^2$
(3) $1+3+5=9=3^2$
(4) $1+3+5+7=16=4^2$
(5) $1+3+5+7+9=25=5^2$

By adding the next higher odd order integer to each preceding summation, all existing perfect squares are produced, with none being omitted. It should also be noted that the number of odd integers in each summation is the square root of the sum. In example five of the preceding table, there are five parts to the summation, and five is the square root of twenty-five. This observation is true for any combination of successive odd integers.

The square root of a number may be extracted by reversing this procedure. In this instance, the successive odd integers starting at one are subtracted to arrive at the square root. The following example illustrates this:

| 16 | 15 | 12 | 7 |
| −1 | −3 | −5 | −7 |
|----|----|----|----|
| 15 | 12 | 7 | 0 |
| (1) | (2) | (3) | (4) |

The number of successive subtractions is the square root.

This is a satisfactory method for use with perfect squares. A related method of deriving the square root is accomplished by applying a simple formula rather than counting the subtractions to arrive at the square root. This formula is represented by the equation $R=(N+1)/2$ where N is the last integer to be successfully subtracted (no overdraft), which is sometimes called the "partial root" and R represents the square root.

In an example of extracting the square root of 64, it is obvious that the last number that could be successfully subtracted would be fifteen. By adding one to fifteen, which would be sixteen, and then dividing by two, the eight would be the square root of sixty-four.

This method, which has been presently shown, is valid for small numbers but is unduly cumbersome for large numbers. Since the number of subtract cycles is equal to the square root of the number, an excessive length of time is necessary to complete a problem using large numbers. Thus, this method, although valid, does not represent a practical solution to the problem of extracting the square root.

A modification of this method of extracting the square root provides for the number, starting at the decimal point, to be divided into pairs of digits called "couplets." Beginning at the most significant couplet, the answer may be derived, one digit being produced for each couplet. However, the couplets must be operated upon in a way that is somewhat different than was done in the previous examples.

If, for example, the number 441 is to have its square root extracted, it appears as 04 41 when divided into couplets. The root of each couplet will become one digit of the final square root, which will have two digits to the left of the decimal point. However, the root of 04, and the root of 41 cannot be combined in any way to produce the root of the original number. The first step is to operate upon the most significant couplet by subtracting successive odd integers as shown below:

```
  04      03
  -1      -3
  ---     ---
  03      00
```

The method now provides for a one to be added to the three so that $3+1=4$, and this number is used to begin operation on the second couplet. First, however, since the partial root for the most significant couplet is in the tens column of the final result, it must be altered by multiplying by ten. The second step is to use this result $4 \times 10 = 40$, add one, and begin operations on the second couplet.

```
   41
  -41
  ---
   00
```

Now applying the formula, we have $$(41+1)/2 = 42/2 = 21.$$

Thus, the square root of 441 is 21. In this example, there was no remainder so that the problem is completed at this point.

While the method described of utilizing couplets in the derivation of the square root could possibly be implemented by digital techniques, the final step of dividing by two could add an amount of time to the total operation as to make it inacceptable for use in an electronic desktop calculator.

The previous examples used successive odd integers in the subtraction process, as 1, 3, 5, 7, 9, etc. The final step in the process was the division by two. However, the novel method of extracting a square root as utilized in this invention produces the same end result by separating each of the above subtract cycles into two steps. The table below illustrates how this is done:

| Normal method | | Modified method | |
| --- | --- | --- | --- |
| Subtract cycles | Odd integer | Subtract cycles | Odd integer |
| 1 | 1 | 1st pair { 1, 2 | 0 <br> (1) $0+1=1$; $0+1=1$. |
| 2 | 3 | 2nd pair { 3, 4 | 1 <br> (3) $1+1=2$; $2+1=3$. |
| 3 | 5 | 3rd pair { 5, 6 | 2 <br> (5) $2+1=3$; $3+2=5$. |
| 4 | 7 | 4th pair { 7, 8 | 3 <br> (7) $3+1=4$; $4+3=7$. |
| 5 | 9 | 5th pair { 9, 10 | 4 <br> (9) $4+1=5$; $5+4=9$. |

It is to be noted that for each normal cycle, there are two subtractions in the novel system. The first half of the novel subtract cycle uses the previous integer developed in the prior step, while the second subtract cycle comprises a first subtraction by zero, followed by a second subtraction by one $(0+1)$; the second subtract cycle comprises a first subtraction by one followed by a second subtraction by two, and so on.

Since there are twice as many subtract cycles as before, it is not necessary to divide by two at the final step. The *last* successful subtract is the square root by this novel method.

A complete example to four significant digits in the root is given below to illustrate the way the method works:

181 in couplets (01 81)

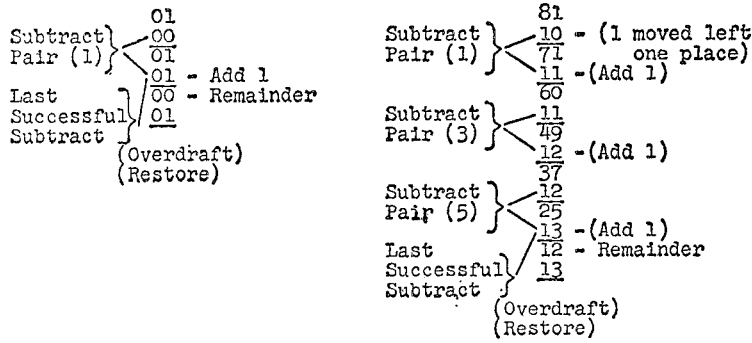

The last successful subtraction yielded the number thirteen, and the square root of 181 is 13 plus a decimal amount. This decimal amount can be found by continuing the subtractions using another couplet (00) and whatever remainder is left. In this case 12.

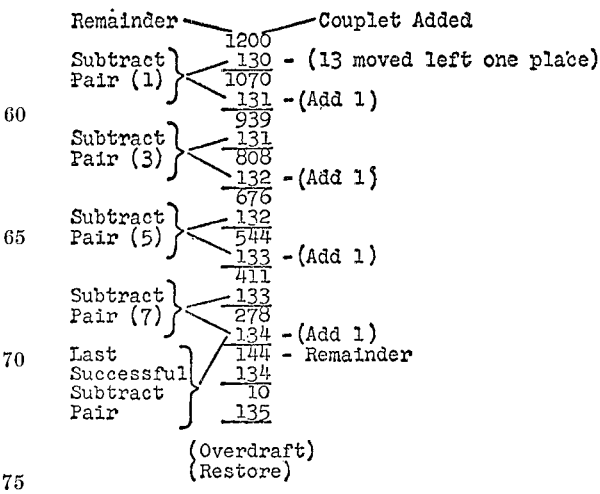

The last successful subtraction yielded the number 134, which properly decimal aligned would be 13.4. A closer approximation of the square root of 181, then is 13.4. If more decimal places are desired, then another couplet (00) is used with the remainder each time for each decimal place.

In the foregoing illustration of extracting a square root, the odd integers were found by successively using the last numbers successfully subtracted as the first step in each subtract cycle, then adding one for the second step of the cycle. The odd integer can also be found by adding one to the last number successfully subtracted in the first step of the new subtract cycle, and for the second step using the last number without adding one. In other words, mathematically it does not matter in which step of the subtract cycle that the one is added; the sum of the two steps will still result in the next odd integer.

This is the method used in the illustrated embodiment of the present invention. In the first step of each subtract cycle, one is effectively added to the last number successfully subtracted without, however, affecting the retention of the last number. As the second step in each pair, the retained last number is subtracted. If both pairs of subtracts are successful, then one is directly added to the last successfully subtracted number, which then is used in the next subtracted cycle. It is important to note that each subtract in a pair of subtracts must be successful before the number representing the last successful subtract is actually changed.

In accordance with one exemplary implementation of the novel method of this invention, circuity is provided for extracting the square root of an operand in a serial digital calculator which includes a recirculating memory loop having information stored therein the form of a data train having separate space-time compartments. The recirculating memory loop follows any one of a predetermined number of paths, the particular path being chosen according to the manner in which it is desired to manipulate the information contained in the data train. A timing signal source is synchronized with the memory loop to maintain the information within the loop properly arranged even though the information may be translated a number of times for handling or storage in a memory medium.

A counter is interconnected with the logic of the memory loop and the timing signal source whereby the information is handled in a predetermined manner according to the sequential stepping of the counter and according to circuitry activated by the command to perform the desired function. The initial setting of the counter is determined by the function which is to be performed by the calculator.

When a complete number has been entered into the data train circulating in the memory loop, circuitry provides for a visual indicating means to be stepped a unit value so that the cumulative sum of the number of entries into the data train is available to the operator of a machine.

More specifically, in the illustrated embodiment of the invention, an electronic calculator, in response to a command to extract the square root of an operand, includes means for initating a couplet cycle by removing the two most significant digits of an operand contained in the first register and placing these digits in the two least significant digit positions of a second register. A means is then provided for subtracting the contents of an initially cleared third register from the second register in a first and second subtraction wherein the first subtrahend varies by the value of one from the second subtrahend and the second subtraction occurs only if the remainder from the first subtraction is non-negative. A means is included for incrementing the value in the third register, which represents the developing square root, by one when the remainder from the second subtraction is not negative.

A means is also provided for restoring to the second register the value of the first subtrahend if the remainder in the first subtraction is negative, and for restoring to the second register the values of the first subtrahend and the second subtrahend if the remainder in the second subtraction is negative. A means is also included for shifting the third register one digit to the left after the value in the second register has been restored to the value it had prior to the subtraction pair having a negative remainder. A means responsive to the number of digits removed from the first register is provided for inhibiting further digit removal once a predetermined number of said digits has been removed.

In order to provide correct decimal alignment for the extracted square root there is included a counter which assumes a first count configuration responsive to an indicator of whether the number of digits appearing on one side of the decimal point in the operand is odd or even and is stepped twice for each couplet removed from the first register utnil a configuration representing zero is reached, then the counter assumes a second count configuration representing the number of digits right of the decimal point in the operand and which determines the number of digits which will appear to the right of the decimal point in the extracted square root and is again counted to zero, the further removal of digits from the operand being inhibited when the counter assumes a zero count for the second time.

Accordingly, an object of this invention is to provide an improved electronic calculator and novel method for quickly and simply extracting the square root of a number.

Another object of this invention is to provide an electronic calculator for extracting the square root of an operand in a manner which does not require division of a developed number to obtain the square root.

And yet another object of the present invention is to provide an electronic calculator for extracting the square root of the number in a manner which significantly reduces the number of required steps and, accordingly, completes the operation in a minimum of time.

Still another object of the present invention is to provide an electronic calculator which utilizes a novel method related to the "sum of odd integers" method for deriving square roots.

A further object of the invention is to provide an improved method of extracting a square root in which the steps of commutation are sequentially performed in a calculator.

Another object of this invention is to provide an electronic calculator for extracting the square root of an operand in response to a single command.

Still another object of the present invention is to provide an electronic calculator which uses a minimum of electronic circuitry to extract the square root of an operand at high speed.

And yet another object of the present invention is to provide an electronic calculator which correctly aligns numbers with respect to a decimal point when they are entered into the calculator.

And yet a still further object of the invention is to provide an electronic calculator which correctly aligns an answer with respect to a decimal point.

It is another object of the present invention to provide an electronic calculator which temporarily records the total number of entries into the calculator.

It is another object of the present invention to provide an electronic calculator which counts the entry of each number into the calculator during the operation of a problem.

It is yet another object of the present invention to provide an electronic calculator which is fast in operation, simple and reliable in operation, and inexpensive to construct.

Other objects and advantages of the invention will be evident from the following detailed description, when read in conjunction with the accompanying drawings which illustrate the invention.

In the drawings:

FIG. 1 is a pictorial representation of an electronic calculator embodying the invention.

FIG. 2 is a plan view of the keyboard of the calculator.

FIG. 3 is a simplified block diagram of one embodiment of the present invention.

FIG. 4 illustrates a full field display of information retained in the memory of the invention.

FIG. 5 illustrates the manner in which information contained in a data train is organized in one type of memory which may be utilized with the present invention.

FIG. 6 is a block diagram of a timing means used in this invention.

FIG. 7 further illustrates the organization of information within the data train and its relation to a display on a cathode ray tube.

FIG. 8 is a more detailed block diagram of the embodiment of the invention illustrated in FIG. 1.

FIG. 9 is a logic diagram of a counter means used in the mode control of the system shown in FIG. 1.

FIG. 9A illustrates the different configurations assumed by the counter means.

FIGS. 10 and 11 are logic diagrams of a means used in decimal alignment.

FIG. 12 is a flow chart illustrating the sequential steps of the electronic calculator during performance of the square root function.

FIG. 13 is a flip-flop used in the practice of this invention.

FIG. 14 is the symbol used for an OR-gate.

FIG. 15 is the symbol used for an AND-gate.

FIG. 16 are the symbols used for an OR-gate connected to an inverter.

FIG. 17 is the symbol used for an AND-gate.

FIG. 18 is a diagram of the logic used in temporarily recording the cumulative sum of the entry of numbers into the calculator.

FIG. 18A is a circuit diagram of the diagram of FIG. 18.

FIGS. 19 to 27 are diagrams illustrating the logic for the square root function of the calculator illustrated in FIG. 1.

FIG. 28 shows how FIGS. 20 to 27 are to be arranged.

FIG. 29 is a diagram showing idealized wave forms.

FIG. 30 is a diagram showing idealized wave forms.

FIG. 30A is a wave form appearing in FIG. 30 on an expanded time scale.

Referring to the drawings in detail, and particularly FIG. 3, reference character 10 designates one embodiment of an electronic calculator constructed in accordance with this invention. A pictorial representation of the calculator 10 appears in FIG. 1. The calculator 10 includes an arithmetic unit 12 which is connected with a dynamic memory 14 to form a recirculating memory loop. A timing means 16 is interconnected with the arithmetic unit 12 to synchronize the flow of information through the recirculating memory loop and to also synchronize the selective display of information contained in the loop by a display means 18 which is also interconnected with the arithmetic unit 12. A keyboard 20 is connected to the arithmetic unit 12 for entering information into the recirculating memory loop. A pictorial representation of the keyboard 20 is shown in FIG. 2. The keyboard 20 is also connected to a function control 22 in order to initiate commands to the function control 22 for directing the sequential operation of the arithmetic unit 12 in the carrying out of these commands. The timing means 16 is also connected to the function control 22 in order to synchronize the recirculating memory loop with the manipulation of information by the arithmetic unit 12 in response to commands from the function control 22. The keyboard 20 is connected to an entry counter 24 whereby the cumulative sum of the entry of complete numbers is indicated during the operation of a problem.

Referring now to FIGS. 4 and 5, the organization of information within the recirculating memory loop and the manner in which it is displayed by the display means 18 is illustrated. The memory 14 in the illustrated embodiment of the invention comprises a magnetostrictive acoustic delay line 26 through which information travels in the form of acoustic pulses at the speed of sound. The delay afforded by the delay line 26 is approximately 5 milliseconds.

The information circulating through the memory loop is placed on the delay line 26 in the form of acoustic pulses in a pulse count notation. In a pulse count notation, the number of acoustic pulses in a predetermined space-time compartment represents a digit. For example, four acoustic pulses appearing in a single space-time compartment represents the digit four and seven acoustic pulses appearing in another space-time compartment would represent the digit seven. A data train passing through the delay line 26 represents a plurality of serially arranged space-time compartments in which acoustic pulses representing data may appear. The number of space-time compartments which comprise a data train is shown in FIG. 4, which also illustrates a field display of information as it would appear on the face of a cathode ray tube (not shown) which is used as a visual display in the display means 18.

The information circulating within the memory loop is considered to be arranged in six horizontal registers and fifteen vertical columns. As seen in FIG. 4, only four registers, R1 through R4, and thirteen columns, C2 through C14, are displayed. The register R0 is used internally within the machine for arithmetic purposes and the register RS is used for the retrievable storage of a number.

A column C0 is not used for data but a corresponding space-time compartment at the leading edge of the data train is reserved for a start or synchronizing pulse as will be shown hereinafter. The column C1 does not contain significant digits, but is used to display a negative sign of a number contained in columns C2 through C14 of each register. The thirteen significant digits of a number in each register are displayed in columns C2 through C14.

Referring now to FIG. 7, the arrangement of the information of the display in FIG. 4 into a data train that is circulated through the memory loop is clearly illustrated. The data train which is equal to one word time has the columns C1 through C15 serially arranged therein. The data train is preceded by a start or synchronization pulse which appears in a space-time compartment C0. Within a space-time compartment representing a column, such as the illustrated column time C9, are six space-time compartments which represent the six registers of the data train. Within each one of the register times, such as the illustrated register time R2, are sixteen bit time positions B0 through B15. The illustrated embodiment of the invention uses only nine of these bit times to represent digits zero through nine. As previously disclosed, a digit is represented by an equivalent number of pulses in a pulse count notation.

The start pulse appearing in column time C0 is the first pulse of the data train and is a synchronization pulse for initiating operation of the timing means 16. The timing means 16 is shown in more detail in the logic diagram of FIG. 6. In the illustrated embodiment of the invention, logical "one" or true is 0 volt and logical "zero" or false is —6 volts. An oscillator 28, operating in the present embodiment at a frequency of 666 kilocycles, is connected to one input of an AND gate 30. A flip-flop 32, entitled the Home flip-flop, has its reset or $\overline{\text{Home}}$ output connected to another input of the AND gate 30. The reset input of the Home flip-flop 32 is connected to receive the data train circulating through the memory loop. The only puse of significance on the data train to the Home flip-flop 32, however, is the leading or start pulse contained in C0 column time. The receipt of the start pulse on the Home input resets the Home flip-flop 32 so that the Home output is true and enables the gate 30 to pass the output of the oscillator 28 to the toggling input 36 of clock flip-flop 38. The output of the clock flip-flop 38 provides the clock time for the calculator 10. In the illustrated calculator, this clock time has a frequency of 333 kilocycles.

The output of the clock flip-flop 38 is connected to the input 40 of a bit time counter 42. The bit time counter 42 may comprise four flip-flops (not shown) connected in series so that each flip-flop essentially divides the output of the previous flip-flop by two. This counter has a capacity of sixteen individual configurations, each configuration representing a bit time in the data train. The counter 42 has an output once each sixteen counts or sixteen bits and represents one register time. The output of the bit time counter 42 is connected to the input 44 of R time counter 46. The R time counter or register counter 46 may comprise three flip-flops (not shown) which, if ordinarily serially connected, would have a capacity of eight counts. The flip-flops of the R time counter, however, are interconnected in a manner well known in the art to provide an output pulse after six individual counts. The R time counter 46 is advanced one count each time an input is received from the bit time counter 42. After six counts, the counter is recycled to its initial condition and begins counting again. Every six counts of the R time counter 46 provides an output pulse, which represents one column time, on lead 48 connected to the column time counter 50.

The column or C time counter 50 may comprise four serially connected flip-flops (not shown) with each input pulse received from the R time counter 46 stepping the counter one count until it has assumed each of sixteen individual configurations. After the C time counter 50 has reached its sixteenth configuration, the pulse on its output 52 is transmitted to a display counter 54 and to the set input of the Home flip-flop 32. It is apparent that the pulse appearing on lead 52 indicates that a data train comprising a start pulse and fifteen columns has passed through the arithmetic unit and back onto the delay line 26 and, accordingly, the timing chain may be shut down. This is accomplished by the pulse appearing on the set input of Home flip-flop 32. It is further apparent that the toggling of the Home flip-flop 32 will disenable the AND gate 30 and preclude the timing chain from being advanced by the output of oscillator 28. Thus, it is seen that the start pulse at the leading portion of a data train starts operation of a timing means which provides timing signals for dividing the pulses contained in the data train into individual space-time compartments in accordance with various configurations of the counters within the timing chain and that operation of the timing means is terminated when the column counter 50 indicates that it has reached its terminal configuration. All functions in the calculator 10 are referenced to these various counters and depend upon them for synchronization thereof. Wave forms which illustrate the pertinent timing signals used in the calculator 10 are shown in FIGS. 29 and 30. During the time period when the data train is contained entirely within the delay line 26 and the timing chain is not being incremented, the display on the face of the cathode ray tube is not affected because of the persistence effect of the phosphorescent coating on the face.

A more detailed diagram which more clearly illustrates the recirculating memory loop of arithmetic unit 12 and the memory unit 14 is shown in FIG. 8. This figure also clearly illustrates the way in which the loop may be changed to manipulate data circulating within the loop.

The arithmetic unit 12 comprises four counters 54, 56, 58 and 60. The counter 54 is also termed the A counter. In the present embodiment of the invention it is an up-counter which receives information serially or in parallel and which shifts information in parallel. The counter 56, termed the B counter, receives information in parallel from the A counter 54 or the D counter 60 and also transmits the information in parallel. The counter 58, also termed the C counter in the present embodiment of the invention is a down-counter and receives information in parallel from the A counter 54 or the B counter 56. The counter 58 transmits the information contained therein serially.

The counter 60, also termed the D counter in the present embodiment of the invention is a down-counter. The D counter can receive information serially or in parallel and transmits information in parallel to the A counter 54 or the B counter 56.

The memory loop during normal recirculation comprises the delay line 26, the A counter 54, the B counter 56 and the C counter 58. More specifically, the delay line 26 is connected to a suitable read amplifier 62 which converts acoustic pulses carried by the delay line 26 into electric impulses. The read amplifier 62 is connected through a suitable AND gate 64 to the A counter 54. The AND gate 64 is enabled by a pulse on input 66, termed the advance A pulse, which enables the gate 64 and permits the pulses to step the A counter 54 to a digit value. The counter 54 is also provided with inputs to reset it to a zero configuration and to set it to a predetermined configuration for arithmetic operations. The A counter 54 is connected through an AND gate 68 to the B counter 56. The AND gate 68 is enabled by a Shift A to B pulse to permit the parallel transfer of information from the A counter 54 to the B counter 56. The parallel transfer of information between the counters is covered in much greater detail in U.S. patent application, Ser. No. 319,704, filed in behalf of Robert A. Ragen and assigned to the same assignee as the instant application. The B counter 56 is connected to the C counter 58 through an AND gate 70 whereby information is parallel shifted from the B counter 56 to the C counter 58. The AND gate 70 is enabled by a Shift B to C pulse. The C counter 58 is connected to an AND gate 72. The AND gate 72 is connected to a suitable write amplifier 74 for translating electrical pulses into acoustic pulses which are transmitted through the delay line 26. The AND gate 72 also has an input 76 which receives clock pulses. If the C counter is not equal to zero AND gate 72 will have an output every clock pulse. This output is the Advance C signal. The Advance C pulses are also an input of the C counter to step the C counter down to a zero configuration. When the C counter 58 reaches a zero configuration, the voltage level on the input to the AND gate 72 becomes false, thereby disenabling the AND gate 72 and results in the number of acoustic pulses being placed on the delay line 26 being equal to the digit which was contained in the C counter 58.

Variations may be made in the memory loop in order to manipulate the data by a predetermined transfer of data between the space-time compartments. An example of this is provided by a memory loop which bypasses the B counter 56. In this instance, information is parallel shifted from the A counter 54 through an AND gate 78 to the C counter 58. The AND gate 78 is enabled by a Shift A to C pulse.

Another variation in the memory loop may be provided by the inclusion of the D counter 60. The read amplifier 62 is also connected to the D counter 60 through an AND gate 80. The AND gate 80 is enabled by an Advance D pulse so that pulses received from the read amplifier 62 are permitted to count down the D counter to a configuration which represents the complement of the digit. The information then contained in the D counter 60 may be parallel shifted to the A counter 54. The D counter 60 is connected to the A counter 54 through an AND gate 82 which is enabled by a Shift D to A pulse. The D counter 60 is also connected to the B counter 56 through an AND gate 84 which is enabled by a Shift D to B pulse. The D counter 60 is also provided with carry and $\overline{\text{carry}}$ inputs for use in arithmetic operations.

Another variation in the memory loop may be provided by the inclusion of the D counter 60 in a different manner. Information is counted into the A counter 54, then parallel shifted through AND gate 86 to the D counter 60. The normal A counter 54 parallel shift to B counter 56 through AND gate 68 is disenabled in this instance. The D counter 60 then parallel shifts to the B counter 56 through AND gate 84. The B counter 56 parallel shifts to the C counter 58 which, in turn, causes the information to be placed back on the delay line 26. Including the D counter 60 in the recirculation path results in the information taking that path being delayed one digit time on the line with respect to the timing means.

The entry of information from the keyboard means 20 into the memory loop is through the D counter 60. The particular digit which is entered into the D counter appears on the keyboard input of AND gate 88 which is enabled by an enter pulse appearing on the enabling input of the AND gate 88. For ease of illustration and comprehension, various inputs for setting the counters and the like have been omitted from the drawings.

The D counter 60 is also used in connection with the display of information in the memory loop. During recirculation of information in the loop, digits in the data train are copied into the D counter 60 and parallel shifted to the display means 18 for visual readout on a cathode ray tube (not shown) of the means 18. The U.S. patent application, Ser. No. 322,549, now Pat. No. 3,341,838 filed in behalf of Robert A. Ragen and assigned to the same assignee as the present invention, fully describes the display means 18 and is incorporated herein by reference.

It is noted the normal recirculation memory loop provides for information to be read from the delay line 26 and counted into the A counter 54, parallel shifted to the B counter 56, again parallel shifted to the C counter 58, and then counted back onto the delay line 26. Thus, again looking at FIG. 4 when information is recirculated in a normal memory loop the number 44 would remain in register R1. However, it may be desired to move the number 44 contained in register R1 into the R0 register. In order to shift the number down, it is necessary to alter the memory loop until this operation is accomplished. The shifting of a number from one register down into the immediately adjacent register is accomplished by a shift forward of the digits within the data train. This is accomplished by the digit in the register R1 after being read into the A counter 54 being routed around the B counter 56 through gate 78 into the C counter 58. This shift moves the digit forward one register position within the data train. If this shift is made for each digit register R1 in each column in the data train, it results in the number in register R0 being displaced by the number previously appearing in register R1.

If it is desired to shift a number contained in one register to the immediately adjacent register above it, this shift up may also be accomplished by a variation of the memory loop. In this instance, the digit which has been read into the A counter 54 is parallel shifted through gate 86 to the D counter 60 by an enabling of the gate by a Shift A to D pulse. The gate 68 is disenabled so that the digit is also not shifted to the B counter 56. The digit contained in the D counter 60 at the next shift point is then shifted through the AND-gate 84 which is enabled by Shift D to B pulse to B counter 56. The number then contained in the B counter 56 is parallel shifted through AND gate 70 which is enabled by a Shift B to C pulse into C counter 58 from which it is counted back onto the line as previously set forth. Thus, by adding the D counter 60 to the normal circulation path an extra digit time has been inserted into the loop which results in the number shown in the R1 register being shifted back in time in the data train and replacing the number in the R2 register. If the digit in each column of the A1 register is delayed one digit time, then the entire contents of the R1 register is placed in the R2 register position on the data train and on the display. The variation of the memory loop is termed a shift up since this is the way it would appear in a display. It is to be understood that a shift up operation shifts each register up into the immediately adjacent register position. This results in the R4 register being entirely displaced and the number zero then appearing in the R0 register. It is to be understood that a normal shift up or shift down operation does not effect the $R_S$ register which is used for the storage of a number and is not involved in an arithmetic function.

Another operation, which is desirable to perform in this calculator, is a shift left operation. This operation causes the contents of one particular register to be shifted one column or order to the left, as it would appear on the display. This variation in the memory loop is similar to the variation shown for a shift up, except that the delay provided in the D counter 60 is for one column time. To accomplish a shift left, a digit is shifted from the A counter 54 into the D counter 60 and retained in the D counter 60 for one column time as the data train recirculates in the ordinary memory loop until the digit is reinserted into the data train in the same register but in the position of the next adjacent column to the left. This operation is then repeated for each digit appearing in the number until the entire register has been shifted left one column time with a zero then appearing in the first column.

The basic arithmetic functions of addition, subtraction, multiplication and division are performed by the calculator 10 by selective depression of the function keys, as shown in FIG. 2, which initiate the sequential operation of the calculator to perform the function. To perform addition, the first digit of an addendum is read into the A counter 54. However, instead of the A counter 54 being reset to zero as the digit is shifted into the B counter 56, this reset pulse is inhibited so that the digit is retained in the A counter 54. When the first digit of the addend contained in register R2 is read into A counter 54, it results in the A counter 54 being stepped up until it then contains the sum of both the addend and the addendum. If the sum of these two numbers is greater than nine, the carry-borrow flip-flop 89, shown in FIG. 27, is set and the A counter progresses on past zero to the first order value of the sum. The flip-flop 89 retains a carry signal which is then added to the addition of the two registers in the next column. Thus, if the number contained in register R1 is to be added to the number in register R2, the reset A signal is inhibited after the R1 digit is shifted to the B counter 56 during each column time.

To accomplish subtraction, the first digit of the register R1 is serially read into the A counter 54 and at the same time into the D counter 60. It will be recalled that the D counter 60 is a down counter so that the counting of a digit into it actually places into it the nines complement of the digit contained in the A counter 60. Thus, at the end of R1 time the A counter 54 will contain the first digit of register R1 and the D counter 60 will contain the nines complement of this digit. The contents of the D counter 60 is then parallel shifted into the A counter 54 at the same time that the R1 digit is parallel shifted from the A counter 54 to the B counter 56. When the first digit in register R2, which is the minuend, is then read into A counter 54, it is then effectively added to the complement of the first digit of register R1. This results in the difference of register R1 from register R2 then being held in the A counter 54. If the addition of the minuend to the subtrahend leaves a negative number indicating that the subtrahend, the R1 digit, was larger than the minuend, the R2 digit, a borrow signal is propagated by setting the carry-borrow flip-flop 89 so that the digit one may be substracted from result of the next subtraction. Accordingly, the subtraction is accomplished for each column of the display with the difference being then retained in the register R2, then shifted down from the R2 register to appear in the R1 register of the display 18.

Referring now to FIG. 9, there is shown the phase counter 90 which comprises an important portion of the function control 22 of FIG. 3. The phase counter 90 comprises four flip-flops 92, 94, 96 and 98 which are connected as a counter. A plurality of AND and OR gates are interconnected to the flip-flops for either setting the counter to a predetermined configuration or to sequentially step it in accordance with the progression of the performance of a function by the calculator 10. The phase counter 90 is the main mode control means employed in the calculator 10. The counter 90 has a capacity of sixteen individual configurations which are illustrated in FIG. 9A. Each configuration of the counter 90 enables the associated logic gating which affects the flow of the data train in a predetermined memory loop. The phase counter 90 is stepped from one configuration to another in accordance with the progression of the calculator through the sequential performance of a desired function. The phase counter 90 is set to a predetermined configuration by the depression of a function key, such as the square root key 135 shown in FIG. 2, which sets the counter 90 to a predetermined configuration. The phase counter 90 is then clamped in a particular configuration or stepped through its remaining configurations in a sequence determined by the performance by the calculator 10 of the individual steps required in an arithmetic operation. For ease of illustration, the diagram of the phase counter 90 has been simplified to include primarily the gating relating to the square root function, and reference may be had to the aforementioned patent application, Ser. No. 319,704, for a complete description of a full circuit diagram of the phase counter 90.

A means is provided to correctly decimally align an operand from which a square root is to be extracted and to correctly decimally align the square root. In the illustrated embodiment of the invention this means takes the form of the decimal point counter 100 shown in FIG. 10. The decimal point counter 100 comprises four flip-flops 102, 104, 106 and 108, which are connected as a counter. Each of the flip-flops is toggled by its preceding flip-flop. The 1DPC flip-flop 102 is toggled by an OR gate 110. The output of the OR gate 110 will follow the output of the Home flip-flip 32 as long as the inputs from inverter 111 of FIG. 10 and inverter 252 of FIG. 19 are false. If either input is true, then the OR gate 110 will remain true and will not follow the output of the Home flip-flop 32, thus stopping the toggling action of the 1DPC flip-flop 102. The decimal point counter 100 is initially set by a manually operable means, such as the demical point selection means 112 seen in FIG. 11. This selection means 112 is used to determine the number of columns which will appear to the right of the decimal point in the display. The setting of the selection means 112, as by a thumb wheel 113, will position a plurality of switches 112E through 112M of a wafer 113, shown in FIG. 11, which provide the signals for the initial setting of the decimal point counter 100 through the gates 114, 116, 118, 120, 122, 124, 126, 128, 130, 132 and 134 during the digit entry. The decimal point counter 100, which has fourteen different configurations, is set initially when the square root process is begun by depressing the square root key 135 according to whether there is an odd or even number of columns to the right of the decimal point in the operand and is set again according to the number of columns which will appear to the right of the decimal point.

In FIG. 12, a flow chart illustrates how the electronic calculator 10 implements the novel square root method employed in this invention and sequetnially operates to extract the square root of an operand.

When a series of digits comprising an operand of which the square root is to be extracted is entered into register R1, the phase counter 90 is set to the PC1 or one count configuration. This operand is entered digit-by-digit into the D counter 60, as previously set forth, and inserted into the data train recirculating in the memory loop in the R1 register digit positions. The quare root key 135 is depressed. The number entered is decimally aligned during phase count one by a selective setting of the decimal point selection means 112 which is set by the operator of the calculator 10 to indicate the number of digit positions which appear to the right of the decimal point in the operand displayed in the R1 register. The calculator 10 accepts the position setting of the decimal point selection means 112, and causes the operand to be aligned around that setting in the R1 register. When the decimal alignment of the operand has been accomplished, the phase counter advances to phase count 2 or PC2. In this mode, the registers R1, R2, R3 and R4 are shifted up one register position. This results in the operand now appearing in register R2 with the number previously appearing in register R4, if any, being cleared from the display. The shift up operation also provides for the register RO to be cleared. The decimal point counter 100 is used during PC1 to align the operand in the R1 register around the decimal point. In all phase counts of the phase counter 90 subsequent to PC1, the decimal point counter provides a reference for couplets to the logic of the calculator 10.

It will be recalled that the square root operation is mathematically performed upon pairs of couplets of numbers taken from digit positions left of the decimal. The first subtract cycle is performed on the most significant couplet position left of the decimal point, columns C14 and C13. Since the calculator 10 has a capacity of thirteen digits in the registers and a decimal point may be positioned between any two digits, it is, therefore, possible for an odd number of digits to appear left of the decimal point. If the calculator 10 were to begin the square root operation on the two most significant digits appearing in register R1, columns C13 and C14, an error would result since the last couplet appearing to the left of the decimal point would actually only contain one digit. Accordingly, it is necessary to indicate initially to the logic of the calculator 10 that an odd number of digit positions appear to the left of the decimal. When this indication has been made to the calculator 10, it will place a zero to the left of the most significant digit position in register R2 and operate upon the zero and the most significant digit position as the most significant couplet. This is accomplished by placing a zero in column 15. The first most significant couplet considered by the machine is then comprised of the digits in columns C15 and C14 of register R2.

A diagram of the logic for performing a "register expansion" function is shown in FIG. 21. The output of the OR gate 137 is true during column times C0, C1, and under certain circumstances C15. The signal is used in the shifting logic throughout the calculator 10 and is referred to as the "register expansion signal." During normal operation of the calculator no shifting action other than the A to B, B to C shift is performed during C0, C1, or C15 times. However, during performance of the square root operation, if an odd number of digits appear left of the decimal point in register R1, as indicated by the DPS13 signal which originates on the wafer 112H of the decimal point selection means 112 of FIG. 11, column C15 of the data train is "opened" for use during the operation. The opening of column C15 effectively allows the calculator 10 to recognize fourteen digits in the R2 register and thereby accommodate the zero which now appears in column C15 of register R2 and which will be used with the most significant digit in column C14 of that register as the most significant couplet.

In phase count PC2, the decimal positioning means 112, if set for an even number of digits to appear to the right, the decimal point indicates that an odd number of digits appears to the left of the decimal point on the display and the decimal point counter 100 will be set to a predetermined configuration. If the decimal point selection means 112 is set for an odd number of digits to appear to the right of the decimal point which would result in an even number of digits appearing to the left of the decimal point, the decimal point counter 100 will be set to a different configuration. Once these operations have been performed during phase count PC2, the phase counter steps to phase count PC3. The logic of the calculator is so arranged that a function is not performed by the calculator during this phase count and, accordingly, the phase counter 90 automatically steps to the four phase count PC4. In count PC4, the operand which is now contained in the R2 register, is left shifted one digit position. With the shifting of the operand left one digit, the last digit which had appeared in column 14 or column 15, if the "register expansion" signal is present, is retained in the D counter 60 until the data train again begins to flow through the counters.

The phase counter 90 then steps to the phase count PC5. When the digit in column C2 of register R1 has been read into the A counter 54 and is to be shifted to the B counter 56, this shift is disenabled and the digit contained in the D counter 60 is parallel shifted into the B counter 56. The digit from the R1 register, which was shifted into the D counter 60 at the same time the D counter 60 shifted its contents to the B counter 56, is retained there for one column time and is then reinserted into the data train at the next R1 digit time of the next most significant column. Thus, the operand contained in the R1 register has been shifted left one digit. The decimal point counter 100 has also incremented or stepped one step.

The phase counter 90 then steps to the count PC6. The most significant digit in register R2 is again retained in the D counter 60 after all of the digits in register R2 are shifted left and is then reinserted into the data train at the C2 position of the R1 register in the next count PC7 of the phase counter 90. This results in shifting the R1 register one digit to the left as in phase count PC5.

The decimal point counter 100 is then incremented again to indicate that the most significant digit then existing in register R2 has been left shifted from the register and placed into the least significant digit position of register R1. It will be seen that the net result of phase count steps PC4 through PC7 is to shift the operand contained in register R2 two digits to the left and to take the two most significant digits from register R2 and insert them into the first two columns C2 and C3 of register R1, which are the least significant digit positions. The decimal point counter 100 is then incremented by two to indicate that the total number of digits in register R2 has been reduced by two. The decimal point counter 100, as mentioned before, is the means used by the calculator 10 to determine the number of couplets to be shifted from register R2 into register R1 and its setting is dependent upon whether the decimal point selection means 112 was odd or even in phase count PC2.

Once a couplet has been removed from register R2 and placed in register R1, the phase counter 90 steps to phase count PC8.

It will be recalled from the discussion on square root theory that normally a series of odd integers are subtracted from each couplet until a subtraction results in an overdraft or a negative difference. This subtraction is referred to as a "subtract cycle." When this overdraft occurs, the last digit subtracted is added back to the last result to restore the minuend to the value it had before the unsuccessful subtraction took place. The last successful subtrahend was incremented by one and multiplied by ten to prepare it for the series of subtractions to be performed upon the next most significant couplet. This process will be referred to hereinafter as the "couplet cycle."

Essentially what phase counts PC8 through 14 accomplish is a modified couplet cycle. In this modified couplet cycle the subtract cycle is performed in two steps, with the sum of the two subtrahends in the cycle being equal to the corresponding single subtrahend used in the normal method. In the novel method employed in the illustrated embodiment of the invention, the subtrahend in the first half of the cycle has a value increased by two over the value of the last successful subtrahend in the previous cycle. The second subtrahend in the subtract cycle is one less than the first subtrahend of that cycle.

As the phase counter 90 is stepped through phase counts 8 through 11, a modified subtract cycle is accomplished. In phase count PC8 the couplet contained in register R1 is the minuend and is reduced by the subtraction from it of the subtrahend of one plus the number contained in register R0. Since register R0 was cleared in phase count PC2, in the first subtract cycle of the first couplet, it then contains zero. If this subtraction was successful, which would be indicated in phase count PC9 by the C0F flip-flop 300 not being set, the phase counter 90 then steps to phase count PC10. In phase count PC10, the difference remaining from the first subtraction is now reduced by the value of the number contained in register R0. The number in register R0 in this subtraction is obviously one less than the value of the subtrahend which was subtracted in phase count PC8 and in the case of the first subtract cycle, has a zero value. If this second subtraction is also successful, again being indicated by the carry overflow flip-flop 300 not being set, the phase counter 90 is stepped to phase count PC11 and the digit one is added to the number contained in register R0, causing R0 to assume the value successfully subtracted in the first half of the subtract cycle. The phase counter 90 is then returned to phase count PC8. The digit one contained in R0 then represents the developing square root of the operand since the register R0 is the register which retains the square root as it is being developed.

The cycle of phase counts PC8 through 11 is repeated until an overdraft is indicated in count PC9 or count PC11. It will be noted that when the calculator returns to count PC8, the subtrahend used in PC8 has a value which is two more than the last subtrahend of phase count PC10, a one having been added to the subtrahend in both phase count PC11 and a temporary one in PC8.

If an overdraft occurs after the subtraction in phase count PC8, the phase counter 90 jumps to phase count PC14. Phase count PC14 prepares the number contained in register R0 for the next couplet cycle by left shifting the number one digit or one column, which is, in effect, multiplying the number by ten. During phase count PC14 the number in the register R1 is also restored to the value it had prior to the unsuccessful first subtraction. Thus, with the number in the register R0 having been multiplied by ten and the value of the couplet in register R1 being restored, the phase counter 90 then returns to phase count PC3 to shift the next significant couplet from register R2 into the least significant couplet position of register R1 and to initiate a new couplet cycle.

If the first half of a subtract cycle was successful in phase count PC8, but failed in the second half of the cycle in count PC10, the phase counter 90 then advances to phase count PC12 instead of recycling to count PC8. In phase count PC12, the value of the subtrahend just subtracted in phase count PC10 is restored to register R1 and the machine proceeds to step through phase count PC13 to phase count PC14. In phase count PC14 the value of the number retained in register R1 in again incremented but this time by the value successfully subtracted in the first half of the unsuccessful subtract cycle. The couplet in register R1 is restored to the value it had at the completion of the last successful subtract cycle. The number in register R1 is increased, as noted above, and a new couplet cycle is initiated.

Whether a new couplet cycle is initiated in phase count PC14 depends upon the configuration of the decimal point counter 100. The counter 100 will reach a zero count or configuration in phase count PC14 only after all of the arithmetic requisite for deriving the square root of an operand has been performed. If the counter 100 has a zero count configuration in phase count PC14, the phase counter 100 will proceed to count PC15. In phase count PC15, the registers R3 and R4 are down shifted to occupy registers R2 and R3, respectively, and register R0 which contains the extracted square root is shifted up to occupy register R1. These operations are not essential to the square root process, but are merely to restore the numbers to the most desirable registers for display purposes. The phase counter 90, upon completion of the operations and phase count PC15, then steps to phase count PC0 to await a command from the keyboard 20 to perform a new function.

The present invention also has the capability of automatically aligning the derived square root to the same decimal significance as that of the operand. This "answer alignment" is performed during the square root operation. It will be recalled that during phase count PC2, the decimal point counter 100 was set to one of two predetermined configurations. This setting of the counter 100 determines the minimum number of digits to be shifted from the register R2, which holds the operand during the square root operation. For each pair of digits removed from register R2, the developing square root contained in register R0 is shifted one digit left during the decimal alignment in phase count PC14. As an example, assume that the decimal point selection means 112 was set to "zero," indicating that thirteen digit positions appear to the left of the decimal point in the operand appearing in register R1. This setting results in the decimal point counter 100 being set to a fourteen count. The "register expansion" signal previously discussed permits the calculator 10 to add a zero to column 15, which appears left of the most significant digit position in the operand, and to operate then upon seven couplets. The square root which appears in register R0, therefore, will have seven significant places. If, however, the selection means 112 is set to thirteen which places the decimal point at the extreme left of the operand, the decimal point counter 100 is set to a twelve count, because the number of digits right of the decimal point is odd, and would, accordingly, count to zero in twelve counts. This would result in the answer developed in register R0, having only six significant places since the operand placed in the machine had thirteen digits right of the decimal point. This obviously would be unsatisfactory.

Accordingly, the present invention also has the novel added feature of developing as many significant digits to the right of the decimal point in the square root as there were in the operand. This is accomplished by the calculator 10 in the following manner. Whenever the decimal point counter 100 is stepped to zero count, from its initial twelve or fourteen setting, during phase count PC7, the DPS 136 flip-flop in FIG. 20 is set, which triggers AND gates 132, 130, 126, 124, 120, 118, 116 and 114 in FIG. 10. These AND gates are enabled by the wafer 113 in FIG. 11 and will set the decimal point counter to a configuration representing the number of digits right of the decimal. Once the counter 100 has been set to this configuration, the calculator then continues to shift digits from register R2 into register R1. It will be noted that when the decimal point counter 100 first reached a zero state after being counted down from a twelve or fourteen count configuration that all of the digits that had been placed in register R2 had been removed leaving all zeros. When the decimal point counter 100 is set for the second time, in this instance being set to a configuration representing the number of digits to the right of the decimal point, the calculator 10 continues to derive the square root until the decimal point counter 100 is counted to zero again. It is when the decimal point counter 100 reaches a zero count for the second time, that the phase counter 90 is permitted to step to phase count PC15 instead of recycling from phase count PC14 to count PC3. The calculator 10 is instructed that the decimal point counter 100 has been counted down twice by the output of the DPS flip-flop 136. During the counting down of the decimal point counter 100 for the first time, the output of the DPS flip-flop 136 is false and is set to a true output only when the decimal point counter 100 reaches zero the first time. The DPS flip-flop 136 remains set during the second counting down of the decimal point counter 100. The accuracy of the resulting answer can be appreciated by considering the previous example of a number which has thirteen digits to the right of the decimal point. The first setting of the decimal point counter 100 in count PC2 is to a twelve count as it always is for numbers with an odd number of digits to the right of the decimal point. This setting develops six positions in the square root, at which time the decimal point counter 100 has been counted to zero. The decimal point counter 100 is then set to thirteen, which corresponds to the position of the decimal point selection means 112, thereby causing another seven positions to be developed in the square root. The square root, therefore, has thirteen significant digits.

If the original operand was entirely a whole number, that is with zero digits appearing right of the decimal and thirteen digits left of the decimal, the answer would have seven significant digits in it because after the decimal point counter 100 was first counted to a zero count, and the DPS flip-flop 136 set, the configuration of the decimal point counter 100 would not be changed since the decimal point selection means 112 would indicate zero.

Any decimal position between these two extreme decimal positions will result in an answer containing as many significant digits to the right of the decimal point as the operand has in the manner previously described.

In FIG. 13, symbol 140 illustrates a typical flip-flop used in the calculator 10. The flip-flop 140 has a first S1 set input 142 and a second S2 input 144. The flip-flop 140 is also provided with a toggle input 146, a first R1 reset input 148, and a second reset input 150. When the flip-flop 140 is set or a logical one or true, the FF output 152 is true and the $\overline{FF}$ output 154 is false. A true input on S1 input 142 will cause the flip-flop 140 to go true. A true input on R2 input 150 will cause the flip-flop 140 to go false or reset. The three inputs 144, 146 and 148 have an open diamond connection to the flip-flop 140. An open diamond connection indicates that the flip-flop will be set or reset by the input signal as it changes from false to true. As an example, it will be seen that if the S2 input 144 transitions from false to true, the flip-flop 140 will be set. If the R1 input 148 transitions from false to true, the flip-flop 140 will be reset and if the toggle input 146 transitions from false to true, the flip-flop 140 will go to the opposite state. That is, a toggle input 146 will cause the flip-flop 140 to be set if it was previously reset, or it will reset the flip-flop 140 if it was previously set. An OR gate is represented by the symbol 156 in FIG. 14. The output 158 of the OR gate 156 will be true if either the A input 160 or the B input 162 or both are true. The output 158 will be false if neither A input 160 nor B input 162 is true. An AND gate is represented by symbol 164 in FIG. 15. The output 166 of AND gate 164 is true when both the D input 168 and the E input 170 are true. If either input is false, the output 166 is also false.

In FIG. 16 an OR gate 172 is connected to an inverter 174. The output 176 of the inverter 174 is the inverse of the output of the OR gate 172. The signal appearing on output 176 is true only when the output of the OR gate 172 is false. The OR gate output will be false only when both the inputs 178 and 180 are false. The combination of the OR gate 172 and the inverter 174 serves the same function as an AND gate 164 having the complementary inputs of the OR gate 156.

The AND gate 182 shown in FIG. 17 performs the same function as the combination of the OR gate 172 and the inverter 174 shown in FIG. 16. The AND gate 182 will have a true output on the J lead 184 when a true signal occurs on both the G input 186 and H input 188.

The calculator 10 also includes an entry counter circuit 192, the diagram of the logic of which is shown in FIG. 18, which advances by one for each complete number entry into the calculator 10 where they are completed by depressing the enter key 190 of FIG. 2, or by initiating a function directly after digits have been placed in register R1. The entry counter circuit 192 includes a mechanical counter 194 that has a four digit capacity and which is advanced or incremented one for each impulse supplied to it. The details of the counter 194 are not disclosed since such a counter is well known in the art.

In accounting, an entry is considered to be the recording of a complete number in proper decimal alignment. A number comprises one or more digits. In the calculator 10, a number is entered into the machine digit by digit and then decimal aligned as part of an arithmetic function or by the enter key 190. The entry counter circuit 192 registers only the operation of decimal alignment, which completes the number as a valid entry and indicates that the entry of the number has terminated. The incrementing of the counter 194 is controlled by an amplifier 196 having as an input an emitter follower amplifier 198. The input of the emitter follower 198 is connected to an OR gate 200 which has two inputs. A first input is connected to the output 202 of flip-flop 204 and the second input is connected to the output 206 of inverter 208. When both inputs 202 and 206 to the OR gate 200 are false, the output is false and when inverted by the inverter 196 to true, the entry counter is incremented or advanced by one.

The 202 output of flip-flop 204 will be false when the flip-flop 204 is set. The flip-flop 204 will be set by a true signal on set input 210, which occurs when the first digit of a number is entered. Thus, a true signal on input 210 insures that the flip-flop 204 is set at the beginning digit of a number entry. The false signal on input 206 is developed by inverter 208 which produces a false input pulse when triggered by the leading edge of an input signal on 212 that is longer than 20 milliseconds. The input 212 to inverter 208 receives the set output of CFS flip-flop 258 in FIG. 20 which is set by the depression of the entry key 190 or the depression of any function key such as addition, subtraction, or the like. Thus, the first false input for the OR gate 200 is supplied by the setting of flip-flop 204 by the endigiting of the first digit of a number and then the second input is supplied by the completion of the entry of the number by the depression of the entry key 190 or the initiation of a function to be performed by the calculator 10. The counter 194 may be cleared and returned to zero by pressing the reset button 214.

A circuit diagram for the logic of the entry counter circuitry 192 shown in FIG. 18 will be seen in FIG. 18A.

Now that the novel method used in the present invention to extract the square root of an operand has been described, a more detailed explanation of the implementing logic will be given.

PHASE COUNT ONE

Decimal alignment is accomplished during phase count PC1. The phase counter 90 and its associated logic are shown in FIG. 9. A chart of the various counts of the phase counter and the settings of the flip-flops comprising the counter 90 are shown in FIG. 9A. It can be seen from FIG. 9 that the flip-flops will be held to zeros as long as the output of inverter 214 is true, that is, the phase counter 90 will be in a zero count as long as both the Common Function input 216 and Common Digit signal input 218 to OR gate 220 are not true. When either one of the signals is true, the output of OR gate 220 is true, and inverted false by inverter 214 unclamping the phase counter 90. The Common Function input 216 and Common Digit input 218 are the outputs of flip-flops 224 and 228 shown in FIG. 20. When the calculator 10 is waiting for an entry, the flip-flops 224 and 228 are reset or false. As soon as a digit key is depressed on the keyboard 20, the Common Digit key 226 in FIG. 20 sets the Common Digit flip-flop 228, thus releasing the phase counter 90. The phase counter 90 advances from zero to one by causing the 1PC flip-flop 92 to become set. The 1PC flip-flop 92 is set by the output of OR gate 230. The output of OR gate 230 toggles the 1PC flip-flop 92 each time the Home flip-flop 32 goes true each pass of the data train, whenever the other input to OR gate 230, $$PC1 \cdot Common\ Function \cdot \overline{DPCZ}$$

is false. This input will be false until some function key on the keyboard 20 is depressed.

A digit key having been depressed causes the phase counter 90 to advance to count PC1 the first home period. The second home period causes the 1PC flip-flop 92 to go from true to false. The transition from true to false causes the 2PC flip-flop 94 to become set. When the 2PC flip-flop 94 becomes set, the 4PC flip-flop 96 and the 8PC flip-flop 98 also set through gates 232 and 234, respectively. The gate 232 is enabled because the input $(\overline{Mult + Div + Sq\ Root})$ is true and gate 234 is enabled because the input $\overline{Square\ Root}$ is true. The phase counter 90 has thus jumped from count one to count PC14. The next home period sets the 1PC flip-flop 92 and phase counter 90 now assumes a count PC15 figuration. In phase count PC15 the digit which was depressed on the keyboard 20 is entered into the D counter 60. The input signal from the keyboard 20 enables input gates to flip-flops in the D counter 60, which are triggered by the Enter Shift One Left signal from the inverter 236 in FIG. 19. The signal is true when the signal $$\overline{DPS} \cdot Common\ Digit \cdot PC15$$

is true. The DPS flip-flop 136 is false until the operator depresses the decimal point key 248 or a function key closing Common Function key 256.

The digit from the keyboard 20 is now in the D counter 60 during the home period of the data train, that is, when no information is emerging from the line and passing through the counters. During the next pass of the data train through the counters, the logic of the calculator 10 will cause the normal data recirculation path through the counters to be altered for each digit in register R1, that is, every digit on the line will maintain its normal position but each digit in register R1 will be moved. Each R1 digit will be removed from the recirculation path and delayed for one column time and then reinserted into the data train in the succeeding R1 digit time. This causes the R1 register to be shifted one column to the left. When the first R1 digit appears in the A counter 54, it will be routed into the D counter 60, which contains the digit to be entered. At this same time, the digit in the D counter 60 is shifted into the B counter 56 and it then passes normally to the C counter 58 and is then written onto the line 26. The digit entered is now in the first column C2 of register R1.

The logic which accomplishes the shift left is shown in FIGS. 19 and 22. The outputs of inverters 238, 240 and 242 in FIG. 22 control the inputs to the B and D counters 56 and 60. The B counter 56 will always be receiving digits from either the A counter 54 or the D counter 60.

The outputs of inverters 238 and 240 are complements of each other. When one is true, the other is false. The output of inverter 240, which enables the B counter 56 to copy the contents of the A counter 54, is true at all shift times except those times when the output of inverter 244 in FIG. 19 is true.

It will be seen that the output of inverter 244 is true when the equation $PC15 \cdot \text{Common Digit} \cdot \overline{DPS} \cdot R1 \cdot \overline{C0} \cdot \overline{C1} \cdot \overline{C15}$ is true, thus causing the output of 240 to go false, and 238 to go true. The B counter 56, therefore, receives a digit from the D counter 60 at R1 time, instead of copying the contents of the A counter 54 as it normally would. The output of inverter 244 also causes the output of inverter 242 to go true. This signal enables the D counter 60 to copy the A counter 54 at the same time the B counter 56 is copying the D counter 60. During all other shift times, the normal A to B shift takes place. Therefore, at the end of the data train the digit entered from the keyboard 20 has been placed in Column 2 of register R1, the digits in register R1 have been moved one column to the left and when the Home flip-flop 32 comes true, the phase counter 90 which is in phase count PC15, is clamped to count PC0 by the output of 214 coming true.

In FIG. 20 the output of AND gate 246 causes the Common Function and Common Digit flip-flops 224 and 228 to be reset when the Home flip-flop 32 comes true when the phase counter 90 is in a phase count PC15 configuration. With these two flip-flops 224 and 228 reset, the clamp of the phase counter 90 in FIG. 9 by OR gate 220 and inverter 214 is restored. This sequence of events occurs each time an operator of the calculator 10 depresses a digit key on the keyboard 20 until the decimal point key, or a function key such as square root, is depressed.

If the operator is entering a whole number with no decimal positions right of the decimal, the square root key will be depressed at the end of the entry. If, however, the operand being entered has any digit positions right of the decimal point, the operator will set the Decimal Point selection means 112 to correspond to the number of positions right of the decimal point in the operand, and, after entering the digits left of the decimal point, depresses the Decimal Point Key, and then enters the digits right of the decimal point before the square root key is depressed.

Another method of entry available in the present invention is where the operand has no digit positions right of the decimal point, but the operator would like the accuracy of the answer to be carried to one or more positions right of the decimal point. These various alternatives will now be discussed.

Taking the situation where the operand being entered has digits both left and right of the decimal point, the operator enters the digits left of the decimal point, depresses the decimal point key and then enters the remaining digits. The machine accepts the digits entered left of the decimal point, as previously discussed. But when the decimal point key is depressed, the decimal point counter 100 has set into it the number on the decimal point selection means 112, which indicates the number of digits right of the decimal point. Each digit entered after the decimal point key is depressed causes the decimal point counter 100 to count down one. When the decimal point counter 100 reaches zero, no more digits may be entered. If, however, the decimal point selection means 112 is set for a larger number of digits than are actually entered, when the square root key is depressed the calculator 10 will cause the operand entered to be shifted left, counting down the decimal point counter 100 once for each shift. When the decimal point counter 100 reaches zero, the shifting stops and the operand has been automatically aligned to the setting on the selection means 112.

When the decimal point key is depressed, closing switch 248 in FIG. 20, the DPS flip-flop 136 is set. The decimal point counter 100 in FIG. 10 receives the setting from the wafer 113 in FIG. 11. The wafer 113 is enabled by inverter 250. If the MULT signal is false, which it is during digital entry and during square root, the output of inverter 250 is true. This signal is placed on the common of the wafers 112H, 112G, 112F nad 112E. The outputs of these wafers, DPS13, DPS12, DPS11 and DPS10, respectively, are true if the common makes a connection for that particular setting. These signals enable the AND gates on FIG. 10, which are triggered by the DPS flip-flop 136. The decimal point counter 100 flip-flops will then be set to a number corresponding to the number of digits right of the decimal point. Each digit entered after the decimal point key has been depressed will be entered into the R1 register, as previously discussed, except that the signal which enables the shifting is no longer $\overline{DPS} \cdot \text{Common Digit-}PC15$ from inverter 236 in FIG. 19 but, instead, is $\overline{CFS} \cdot \text{Common Digit} \cdot PC15 \cdot \overline{DPCZ}$. The $\overline{DPCZ}$ signal is true until the number of digits entered right of the decimal point have caused the decimal point counter 100 to be counted to zero. The decimal point counter 100 is counted down by OR gate 110 in FIG. 10 each time a digit is entered. If the inputs to gate 110 are false, the output will go true when the Home flip-flop 136 comes true. The one DPC flip-flop 102 will, therefore, be toggled each time the Home flip-flop 136 comes true. The one DPC flip-flop 102 toggles two DPC flip-flop 104, the two DPC flip-flop 104 toggles the four DPC flip-flop 106, and the four DPC flip-flop 106 toggles the eight DPC flip-flop 108. The two inputs to gate 110, other than the Home flip-flop 32, will be false until the decimal point counter 100 reaches zero, so long as the equation $\overline{CFS} \cdot \text{Common Point} \cdot PC15 \cdot \overline{DPCZ}$ from inverter 252 in FIG. 19 is true. Once the decimal point counter 100 has been counted to zero, it can be seen that no further entries will be accepted by the calculator 10. If, however, the decimal point counter 100 has not yet been counted to zero, and the operator terminates the entry by depressing a function key such as the square root key in the present instance, the following action is taken:

The square root key switch 254 in FIG. 20 sets the square root flip-flop 222. The common function key switch 256 closes at the same time as the square root switch 254 and sets the common function flip-flop 224. When common function flip-flop 224 is set, it sets the common function store flip-flop 258, CFS. The phase counter 90 was unclamped the common function flip-flop 224 coming true and the next home period steps to a one count, as previously discussed. The phase counter 90 will not count beyond count PC1, however, because as soon as the phase counter 90 assumes the one count configuration, the input signal to gate 230 in FIG. 9 is true from inverter 260 in FIG. 19, $PC1 \cdot \text{Common Function} \cdot \overline{DPCZ}$, and thus prevents the Home flip-flop 32 from causing one PC flip-flop 92 to toggle. The output of inverter 260 is true, resulting in a true output from inverter 244 every R1 time during all columns except C0, C1 and C15. This signal, in turn, causes the register R1 to shift left one column, as previously discussed. The register R1 is shifted left one column each pass of the data train, until the decimal point counter 100 has been counted to zero. The decimal point counter 100 is counted down one count by the Home flip-flop 32 input to gate 110 in FIG. 10. When the decimal point counter 100 has reached a zero count, the shifting is inhibited and the output of inverter 260 in FIG. 19 goes false, thus releasing the phase counter 90, enabling it to advance beyond count PC1.

If the operator, desiring the answer to be carried several places right of the decimal point has positioned the decimal point selection means to the corresponding number and then enters only a whole number containing no decimal point, and then depresses the square root key, the following action is taken.

The square root flip-flop 222, the common function flip-flop 224 and the common function store flip-flop 258 in FIG. 20 are set as before. However, since the decimal point key was not depressed, the DPS flip-flop 136 was not set as before to allow the decimal point counter 100 to copy the setting of selection means 112. The CFS flip-flop 258, as can be seen from FIG. 20, causes the DPS flip-flop 136 to be set. The decimal point counter 100, therefore, copies the setting of selection means 112. The phase counter 90 was released from zero when the common function flip-flop 224 came true, and counted to one, but, as before, was prevented from counting any further. From this point, the calculator 10 causes the register R1 to be shifted left one column for each count in the decimal point counter 100. When the decimal point counter 100 has been counted to zero, the shifting stops and the phase counter 90 is allowed to proceed to the next configuration, phase count PC2.

The phase counter 90 advances to a count PC2 configuration at the first home period after the decimal point counter 100 reaches zero, which causes the input $PC1 \cdot$ Common Function $\cdot \overline{DPCZ}$ to gate 230 in FIG. 9, to go false. The Home flip-flop 32 coming true causes the 1PC flip-flop 92 to toggle from true to false. The 1PC flip-flop 102 causes the 2PC flip-flop 104 to toggle from false to true, the phase counter 90 thus assumes the phase count PC2 configuration.

PHASE COUNT TWO

In phase count PC2 the operand in register R1 is shifted up to register R2 and the register R0 is cleared.

During the recirculation of the data train, the phase counter 90 is in a phase count PC2. The digits are read by the read amplifier 62 and counted into the A counter 54. The shift A to B signal is disabled and the shift A to D and D to B signals are enabled, during register times R1, R2, R3 and R4. This causes the digits in these registers to be delayed one register time, effectively shifting each register up as it would appear on the display. The output of OR gate 260 in FIG. 19 is the signal that causes this action. When the output of gate 260 is false, the output of inverter 244 is true. This signal is used in FIG. 22 to cause the shift D to B and shift A to D signals to be true and the shift A to B signal to be false. During each R0 time of this pass of the data train the output of inverter 264 in FIG. 22 is true. This signal is connected to the input of OR gate 266 in FIG. 24. The output of OR gate 266 is true and inverted by inverter 268, therefore, the output of OR gate 270 is false because neither of the other two inputs to gate 270 are true. When the output of gate 270 is false, the A counter 54 does not advance. The A counter 54, which is reset at B15 time of each digit by the output of inverter 272 in FIG. 24, therefore remains on zero for the R0 time. At B15 time of R0, the zero in the A counter 54 is shifted to the B counter 56 because the shift A to B signal has not been disabled. At B15 time of the R0 digit, as the A to B shift occurs, the reset D signal from FIG. 22 comes true. The output of inverter 264 is effectively anded with B15 by OR gate 274 and inverter 276, causing the reset D signal to be true, at $PC2 \cdot R0 \cdot B15$. This signal is placed on the reset input to all flip-flops of the D counter 60.

The next digit time is the R1 digit. The R1 digit is counted into the A counter 54 and then shifted to the D counter 60, as previously discussed. At the same time the D counter shift to the B counter is also enabled and the zero set into the D counter 60 is copied by the B counter 56. This effectively causes the R1 digit to be replaced by a zero. The net result of this pass of the data train during count PC2 is to cause the register R0 to be cleared, the register R1 to be moved up to register R2, and cleared to zeros. The R2 and R3 registers are also moved up. At the end of the line, the Home flip-flop 32 comes true and causes 1PC flip-flop 92 in FIG. 9 to toggle true. The phase counter 90 is now at a count PC3.

When the synchronizing pulse appears again at the read amplifier 62, the clock and timing means 16 are again initiated, but nothing occurs during this pass of the data train. The data is simply counted into the A counter 54, shifted to the B counter 56, then to the C counter 58 and counted down onto the line. The logic which causes the C counter 58 to count down is shown in FIG. 26. The output of 309 is false whenever the C counter 58 contains a digit other than a zero. Therefore, at all bit times other than B14 or B15, the output of 313 will follow clock. The output of inverter 313 is the Advanced C signal shown in FIG. 8. Each clock pulse in the C counter is counted down one count and the write circuitry is pulsed at the same time. When the count assumes a zero count, inverter 13 no longer follows the $\overline{clock}$ signal and the counting and pulsing stop.

When the end of the line occurs, causing the Home flip-flop 32 to come true, the 1PC flip-flop 92 is toggled false, causing 2PC flip-flop 94 to toggle false. Since the phase counter 90 was in a count PC3 prior to this action, the output of OR gate 280 in FIG. 9 was true, therefore, as the 2PC flip-flop 94 goes false, the reset side of 2PC flip-flop 94 transitions from false to true, triggering gate 282 which, in turn, causes 4PC flip-flop 96 to become set. The phase counter 90 thus assumes a count PC4 configuration.

PHASE COUNT FOUR

During count PC4, the R2 register is shifted one column left. The least significant digit in column 2 of register R2 is replaced by a zero and the most significant digit in either column 14 or 15, as the case may be, is shifted into the D counter 60 and retained there until the next pass of the data train during count PC5, when it is reinserted into the first R1 digit position by shifting the digit from the D counter 60 to the B counter 56.

The data train recirculates during count PC4 in the normal manner except for R2 digits. When the equation $R2 \cdot (PC4 + PC6) \cdot \overline{C0} \cdot \overline{C1} \cdot \overline{C15}$ is true, the output of inverter 244 in FIG. 19 is true. This causes the shift A to D and shift D to B signals from inverters 242 and 238, respectively, to be true at B15 time. Every R2 digit during count PC4 is shifted from the A counter 54 to the D counter 60. As this shift occurs, the D counter 60 is also shifted to the B counter 56. The D counter 60 contained all zeros at the first shift from the D counter 60 to the B counter 56, therefore causing a zero to be placed in the first column, C2, of register R2. This zero was inserted into the D counter 60 during count PC2. During count PC2, at register R4 of column C14, the R4 digit was shifted from the A counter 54 to D counter 60, the shifting stopped, leaving the C14 digit of register R4 in the D counter 60. At register R0 of column C15, the output of inverter 264 came true. This signal in FIG. 22 caused the reset D signal from inverter 276 to come true, zeroing out the D counter 60. The D counter 60 retains a zero until the shift A to B of the R2 digit in count PC4 occurs.

Each digit of register R2 is shifted one column left until either the C14 or C15 digit of register R2 is shifted into the D counter 60. This digit is retained as previously described, until the next pass of the data train, when it is inserted in register R1. Recall that if the operand has an odd number of digits left of the decimal point, a zero is placed left of the last digit on the left end of the operand, so that there will be an even number of digits left of the decimal point. The calculator 10 may then remove digits from the left end of register R2, the operand, in pairs, so that when it arrives at the decimal point, there won't be a unitary digit in the last couplet. This zero is attached at C15 time of register R2. Normally, during count PC4, only digits in columns C2 through C14 are shifted from the A counter 54 to D counter 60, with the register R2 digit in column C14 being retained for the next pass. If, however, the decimal point selection means 112, wafer 112H in FIG. 11, is true, indicating that the operand has an odd number of digits left of the decimal point, the $C0+C1+C15$ qualification on OR gate 284 of FIG. 19 is true only for $C0+C1$. This input is derived from OR gate 137 in FIG. 21. This OR gate 137 has a true output during C0 or C1 time, and also for C15 time unless, during count PC4 or count PC6, signal DPS13, from wafer 112H of the selection means 112, is true. When these conditions are present gate 137 will not have a true output during C15 time and the shift from A counter 54 to D counter 60 will occur as it did during the preceding thirteen R2 register digits. The D counter 60 will, therefore, contain a zero, since C15 is not used to store data, which it saves until the next pass of the data train. At the end of the data train, the Home flip-flop 32 is set, causing the 1PC flip-flop 92 to set, placing the phase counter 90 in a count PC5.

PHASE COUNT FIVE

During count PC5, the digit from register R2, which was retained in the D counter 60, is inserted into the first column C2 of the R1 register. The first digit from R1 in the C2 column is counted into the A counter 54. At B15 time of the digit, the shift A to D and shift D to B signals come true and the shift A to B signal is disabled. The signals result from the output of inverter 288 in FIG. 19, which is true during count PC5 or count PC7 times. This signal is inverted by inverter 252. The OR gate 290 and inverter 244 combine to give a true output from inverter 244 during the $PC5 \cdot R1 \cdot \overline{C0} \cdot \overline{C1} \cdot \overline{C15}$ signal. Note that the C15 limitation from FIG. 21 to expand the shifting time is applicable only during count PC4 and count PC6.

At the end of the data train, the Home flip-flop 32 comes true. The true output of the Home flip-flop 32 causes the decimal point counter 100 to be counted down one count. The output of gate 110 will go from false to true when the Home flip-flop 32 comes true, since the other inputs to gate 110 are false. One of the other inputs to gate 110 is from inverter 252 in FIG. 19 and is the inverse of the output of inverter 288 which is true during count PC5 and count PC7. The other input of gate 110 is DPCZ which is false, until the decimal point counter 110 is counted to zero.

The Home flip-flop 32 coming true also causes the 1PC flip-flop 92 to toggle from true to false, 1PC flip-flop 92 toggles 2PC flip-flop 94 true, setting the phase counter 90 to a count PC6.

PHASE COUNT SIX

Essentially, the same logic controls count PC6 and count PC4. In count PC6 the R2 register is shifted one column left. The last digit in R2 is retained in the D counter 60 as in count PC4. The last digit in register R2 will be either the C14 or the C15 digit for reasons previously explained. Note that during count PC4, if the C15 digit of register R2 was the digit that was retained, the C14 digit was shifted into the C15 digit position, and therefore during all subsequent PC4 and PC6 phases, the C15 digit must be retained for count PC5 and count PC7, respectively.

At the end of the data train, the Home flip-flop 32 comes true, causing the 1PC flip-flop 92 to toggle to true, setting the phase counter 90 to a count PC7.

PHASE COUNT SEVEN

Phase count PC7 is essentially the same as phase count PC5. The digit retained in the D counter 60 is inserted in the first column of the R1 register, C2, and all the R1 digits are shifted one column left. When the Home flip-flop 32 comes on, the decimal point counter 100 is counted down one count and the 1PC flip-flop 92 is toggled false. The 1PC flip-flop 92 causes 2PC flip-flop 94 to toggle false. When 2PC flip-flop 94 goes false, the false side of 2PC flip-flop 94 transitions from false to true, causing 4PC flip-flop 96 to reset, since it was previously set. The false side of 4PC flip-flop 96 transitions from false to true, causing 8PC flip-flop 98 to set. The phase counter 90, therefore, assumes a count PC8.

Phase counts PC4 through PC7 have caused the most significant couplet in register R2 to be inserted into register R1. The subsequent phase counts, PC8 through PC14, comprise the "couplet cycle." Within the couplet cycle the operations comprise the "subtract cycle." Each subtract cycle consists of two separate subtractions. The sum of the two subtrahends in the subtract cycle is an odd number. Each succeeding subtract cycle causes the sum of the subtrahends subtracted to be increased by two over the previous two subtrahends. A negative remainder from either of these two subtractions will cause the couplet cycle to be terminated and a new one initiated by recycling the phase counter 90 from PC14 to PC3.

In each subtraction the minuend is the R1 register, which contains the couplet, and, the subtrahend is the R0 register. Since the subtract cycle is comprised of two subtractions, the number developed in R0 is the answer, and when the last couplet cycle is completed, it is not necessary to divide R0 by two. The couplet cycle will now be discussed.

PHASE COUNT EIGHT

In PC8, the number in register R0, incremented by one, is subtracted from the couplet in register R1. The value of the number in register R0 is not actually incremented by one during count PC8, as it will be seen from the subsequent discussion. The R0 digit, as it emerges from the delay line 26, is counted into the A counter 54. Each bit emerging from the line 26 causes the signal $\overline{READ}$, on gate 266 of FIG. 24, to be false. This signal is inverted by inverter 268 to true, so long as the other input to gate 266 is also false. The other input is the signal $PC2 \cdot R0$ and will be false for all phase counts other than count PC2.

The output of inverter 268 causes the "Advance A" signal from gate 270 to be true, the Advance A signal is placed on various input gates to the flip-flop (not shown) of the A counter 54. The other inputs to these gates are the outputs of the A counter 54 flip-flops, thus each time the Advance A signal comes true, various gates are triggered, causing the A counter 54 to advance to a configuration representing one count beyond that which it was previously in. During the same time, the "Advance D" signal in FIG. 25 is also enabled. The Advance D signal will be true when the equation $\overline{READ} \cdot \overline{R0} \cdot \overline{C0} \cdot \overline{C1} \cdot \overline{C15} \cdot$ Square Root $\cdot (PC9+PC10)$ is true. The Advance D signal is an input to several set and reset gates on the D counter 60 flip-flops. This signal causes these gates to trigger, if already enabled by the other D counter 60 flip-flop outputs. Each time the Advance D signal comes true, the D counter 60 changes its configuration in a negative manner, that is, a number counted into the D counter 60 is complemented.

At the end of R0 time, the R0 digit has been counted into the A counter 54 as normal, and, at the same time, has been complemented in the D counter 60. The next thing that happens is a transfer of the digit in D counter 60 into A counter 54 and the normal R0 digit in A counter 54 is shifted to B counter 56. Returning for a moment to the time prior to the C2 digit of R0 register in FIG. 27, inverter 292 has a true output during C1 of register R0, during count PC8. This signal causes the CARRY-BORROW flip-flop 89 to appear to be set. The flip-flop 89 enables AND gate inputs to the D counters DC5 flip-flop. These gates are triggered by the reset D signal of inverter 276 in FIG. 22 coming true. The output of inverter 276 will be true at every B15 time, when the equation Square Root $\cdot (PC8+PC10)$ is true, the signal being received from inverter 296 in FIG. 22.

When the reset D signal comes true triggering the input gates to the DC5 flip-flop it will be set placing the D counter 54 at a preset minus one configuration. At R0 time of column two, the R0 digit is counted into the A counter 54 and complemented in the D counter 60. Since the D counter 60 was already at a minus one, the final digit in D counter 60 at the end of R0 time is the complement of $(R0+1)$. This value is then shifted to the A counter 54 by the term Shift D to A from inverter 298 in FIG. 22. This signal is true at B15 time of R0 for all columns, except C0, C1, or C15, when the output of inverter 296, Square Root·$(PC8+PC10)$ is true. This signal causes the setting of the D counter 60 flip-flops to be copied by the A counter 54. At the same time, the reset A signal from inverter 272 in FIG. 24 is inhibited. Normally, this signal is true at every B15 time causing the A counter 54 to be set to zero. Since the data from the delay line 26 is counted into the A counter 54, each digit time must begin with a zero in the A counter 54 or an error would result. Inhibiting this signal prevents the digit being read into the A counter 54 from the D counter 60 from being lost. The next digit time is register R1. The bits in the digit time in register R1 are counted into the A counter 54 in the usual manner except that the A counter 54 is not zero initially, but contains a negative $(R0+1)$. At the conclusion of R1 time, the A counter 54 contains the sum $R1+[-(R)+10]$ or $R1-(R0+1)$.

If the remainder from this subtraction is negative that indicates that the term $(R0+1)$ was larger than R1. In this event, the calculator 10 will want to step to count PC14 to restore register R1 and initiate a new couplet cycle. This indication of a negative result is provided in the present invention by the Carry-Overflow flip-flop 300 in FIG. 27. This flip-flop 300 is set by the output of AND gate 302. If the Home flip-flop 32 comes true when the Carry-Borrow flip-flop 89 is true, the Carry-Overflow flip-flop 300 will be set. The Carry-Borrow flip-flop 89 is set by the Advance D signal from FIG. 25. That is, when the R0 digit begins to emerge from the line 26 during count PC8 or count PC10, to be counted up in the A counter 54 and complemented in the D counter 60, the Carry-Borrow flip-flop 89 sets. If during the $R1-(R0+1)$ subtraction in the A counter 54, the number in the A counter 54 passes from a negative digit to a positive digit, the Carry-Borrow flip-flop 89 is reset, the resetting signal coming from AND gate 304 in FIG. 27. The AND gate 304 will have a true output if there is an Advance A signal, the AC5 flip-flop (not shown) of A counter 54 is true, and, the AC4 flip-flop (not shown) of A counter 54 is false. This condition of the A counter 54 flip-flops represents a minus one in the A counter 54. Therefore, the Carry-Borrow flip-flop 89 will be reset if the contents of the A counter 54 is a minus one and the R1 digit contains at least one more bit which will be added to the A counter 54 thus causing the A counter 54 to assume a zero count. When the Home flip-flop 32 comes true at the end of the data train, the carry-overflow flip-flop 300 will be set as previously discussed.

If the Carry-Borrow flip-flop 89 was not reset during the subtraction in the A counter 54, it is reset by the Home flip-flop 32 which also causes the 1PC flip-flop 92 in FIG. 9 to be toggled true causing the phase counter 90 to assume a phase count PC9.

PHASE COUNT NINE

No action is taken during count PC9 with the data train recirculating normally. At the end of the data train, the Home flip-flop 32 comes true toggling 1PC flip-flop 92 false which toggles 2PC flip-flop 94 true. The Carry-Overflow flip-flop 32 in FIG. 27 is also triggered to reset, if it was set. If the Carry-Overflow flip-flop 300 was set and this home period caused it to reset, the false side of the flip-flop 300 transitioned from false to true. This output is a trigger input to AND gate 306 in FIG. 9. The AND gate 306 is enabled by square root input and if the Carry-Overflow flip-flop 300 triggers it, giving it a true output, the 4PC flip-flop 96 is set. Therefore, if the Carry-Overflow flip-flop 300 was previously set, the Home flip-flop 32 coming true causes it to rest and at the same time triggers the phase counter 90 to a phase count PC14 configuration. If Carry-Overflow flip-flop 300 was not true indicating, the subtraction in phase count PC8 resulted in a positive remainder, the phase counter 90 is stepped to a phase count PC10 configuration because the Home flip-flop 32 would not cause Carry-Overflow flip-flop 300 to reset triggering gate 306.

PHASE COUNT TEN

During count PC8, the R0 digit was counted into the A counter 54 and complemented in the D counter 60. The value of R0 in the D counter 60 was incremented by one. The R0 digit in A counter 54 was shifted to B counter 56 and $-(R0+1)$ in D counter 60 was shifted to A counter 54. Therefore, during phase count PC10 the digit in register R0 is the original R0 digit. The digit in register R1 is the remainder of the $R1-(R0+1)$ arithmetic. During phase count PC10, the register R0 digit is subtracted from this remainder, the value in the R1 register at the end of count PC10 will be $$R1-(R0+1)-R0$$

The subtraction during count PC10 is accomplished in much the same manner as it was in count PC8 with the exception thta the D counter 60 is not preset to a $-1$ count. Recall that inverter 292 in FIG. 27 had a true output during phase count PC8 which caused the DC5 flip-flop to set when the reset D signal came true at B15 time of column one time of register R0. The output of inverter 292 is not true during phase count PC10. The Carry-Borrow flip-flop 89 was reset by the home period that advanced the phase counter 90 to count PC10 and remains reset, thus, when the reset D signal comes true all the D counter 60 flip-flops are zero set.

The R0 digit in C2 position is counted into A counter 54 and at the same time complemented in the D counter 60. At the end of the digit time, the R0 digit in A counter 54 is shifted to the B counter 56 and the D counter 60 is shifted to A counter 60. The R1 digit is then counted in on top of the $-R0$ digit in the A counter 54. The Carry-Borrow flip-flop 89 which became set when the R0 digit was being counted into the D counter 60 will be reset if the $(R1-R0)$ arithmetic in the A counter 54 results in a positive remainder. If the Carry-Borrow flip-flop 89 is not reset, indicating that the remainder in the A counter 54 is negative, when the Home flip-flop 32 goes true, the Carry-Overflow flip-flop 300 will be set through gate 302. This home period will also cause the Carry-Borrow flip-flop 89 to be reset.

The Home flip-flop 32 causes the 1PC flip-flop 92 to toggle to true, the phase counter 90 is then in a phase count PC11 configuration.

PHASE COUNT ELEVEN

During phase count PC11, if the subtraction in count PC10 was successful, the R0 digit will be incremented by one and the phase counter 90 will be stepped back to the count PC8 configuration to begin another subtraction cycle. If the subtraction in phase count PC10 was not successful, indicated by the Carry-Overflow flip-flop 300 being set, the phase counter 90 will be stepped to a count PC12 to terminate the couplet cycle.

Considering now the situation where the subtraction was successful, Carry-Overflow flip-flop 300 is false, OR gate 308 in FIG. 25 will have a false output during column 1 time of register R4 during count PC11 of the square root function. This output of gate 308 is inverted by inverter 310 to true. The output of inverter 310 is an input to an AND gate (not shown) which sets the AC1 flip-flop (not shown). This AND gate is triggered by the reset A signal generated in FIG. 24. The reset A signal is true at every B15 time, except when the output of either inverters 312 or 314 is true. In this particular instance, neither of these signals is true. Therefore, at B15 time of register R4 in column 1, the flip-flops of A counter 54 are reset except for the AC1 flip-flop which is set. The next digit emerging from the delay line 26 is the R0 digit of column 2. This digit is then counted into the A counter 54. The A counter 54 at the end of the R0 digit time contains the value (R0+1). Note that no provision is provided to propagate a carry to the next column of register R0. This is because the least significant digit in register R0, the developing square root, will never exceed a nine. That is, the situation will never occur where the number in column 2, register R0 is a nine at count PC11 when a one is added to register R0.

At the end of the data train during phase count PC11, the Home flip-flop 32 comes true causing 1PC flip-flop 92 to toggle false. The changing state of 1PC flip-flop 92 causes 2PC flip-flop 94 to toggle false. The phase counter 92 then is back to the count PC8 configuration and the subtraction cycle is repeated.

If the subtraction in phase count PC10 was not successful, indicated by Carry-Overflow flip-flop 300 being true when count PC11 is entered, nothing happens during count PC11. When the Home flip-flop 32 comes true at the end of the data train, the 1PC flip-flop 92 is toggled false. The 1PC flip-flop 92 toggles the 2PC flip-flop 94 false.

The AND gate 306 in FIG. 9 is enabled by the square root flip-flop 222 of FIG. 20 and triggered by the false side of the Carry-Overflow flip-flop 300 when it transitions from false to true. That is, when the Carry-Overflow flip-flop 300 is reset, the Carry-Overflow flip-flop 300 is reset by the Home flip-flop 32 coming true. The phase counter 90 is, therefore, stepped to phase count PC12, because the Carry-Overflow flip-flop 300 has been true during count PC11.

PHASE COUNT TWELVE

The purpose of phase counts PC12 through PC14 is to restore the couplet in register R1 to the value it had before the unsuccessful subtract cycle was initiated in count PC8. Accordingly, in count PC12 the value subtracted from register R1 in count PC10 is restored. The R0 register digit is counted into the A counter 54 in the normal manner and is shifted to the B counter 56. However, the reset A signal which normally causes the A counter 54 to be zero before the next digit from the R1 register is counted in, is inhibited so that when the R1 register digit is counted into the A counter 54, the result is an addition of the R0 register to the R1 register. The reset A signal from FIG. 24 will not come true at B15 time of R0 register during count PC12 because OR gate 319 has a false output during either phase count PC12 or count PC14. Therefore, at R0 digit time the output from inverter 314 will be true into OR gate 316. The inverter 272 inverts this signal to false. The output of inverter 272 is the rest A signal.

If, during the (R1+R0) addition in phase count PC12, the digit in the A counter 54 is counted past nine, the Carry-Borrow flip-flop 89 in FIG. 27 is set by the output of AND gate 318. The gate 318 will have a true output when both inputs to OR gate 320 are false and the Advance A signal comes true. The input to OR gate 320 from OR gate 322 is false when the A counter 54 contains the digit nine. The input to OR gate 320 from inverter 324 is false if the output from inverter 326 in FIG. 22 is true, which it is during the square root function for any phase count except counts PC8 or PC10. The carry-borrow flip-flop 89 will set then if during count PC12 the A counter 54 has a nine in it and the advance A input to AND gate 318 comes true indicating that the R1 digit has at least one more bit in it which will be added to the nine contained in the A counter 54. This carry is propagated to the addition in the next column.

In the next column the same action takes place, the R0 register digit is counted into the A counter 54 and then shifted to the B counter 56. The reset A signal is inhibited at B15 time of register R0 as before, but also the A counter 54 is advanced one count. The output of OR gate 319 in FIG. 24 is false during either phase count PC12 or PC14. This false signal is an input to OR gate 328. The other input to OR gate 328 is the true output of the Carry-Overflow flip-flop 300. The Carry-Overflow flip-flop 300 is false during count PC12 because it was reset by the same home pulse that caused the phase counter 90 to advance to the PC12 count. The output of gate 328 is an input to OR gate 330. The OR gate 330 is inverted by inverter 332 giving a true output when the inputs of gate 328 are false and the inverter 334 input is false, indicating the Carry-Borrow flip-flop 89 is true, at B15 time of register R0, except for column C0, C1, or C15. The output of inverter 332 passes through OR gate 270 enabling the Advance A signal which causes the R0 digit to be counted up one. Now, if the R0 digit in the A counter 54 is less than nine, the addition of one to it will not result in a carry. Therefore, the Carry-Borrow flip-flop 89 in FIG. 27 is reset by the output of AND gate 336. The AND gate 336 has a true output when the output of inverter 332 in FIG. 24 is true and the contents of the A counter 54 is less than nine, indicated by a true output from OR gate 328. If the A counter 54 has a value of nine, then the Carry-Borrow flip-flop 89 will not be reset and will remain set for the next column addition. At B15 time of register R0, then, a one has been added to the R0 digit in the A counter 54 and the reset A signal was inhibited, the R1 digit is then counted into the A counter 54. Thus, at the end of the data train, during phase count PC12, the value in register R0 has been added back into the register R1 and the value in the register R0 has been retained there for subsequent use in count PC14.

Also, during count PC12, the DPS flip-flop 136 in FIG. 20 is set by the output of AND gate 138, if the decimal point counter 100 was zero. The purpose of setting DPS flip-flop 136 has been previously discussed. It allows the setting of the decimal point selection means 112 to be read into the decimal point counter 100.

At the end of the data train, the Home flip-flop 32 goes true causing the 1PC flip-flop 92 to toggle true. The phase counter 19 is then in a phase count PC13 configuration.

PHASE COUNT THIRTEEN

No action is taken during this pass of the data train. When the Home flip-flop 32 comes true, the 1PC flip-flop 92 is toggled false, toggling the 2PC flip-flop 94 true causing the phase counter 90 to assume a PC14 count.

PHASE COUNT FOURTEEN

The phase count PC14 is entered either from phase count PC9 or PC13. Both entries were previously discussed.

If the calculator 10 entered the phase count PC14 from count PC9, it was because the first half of the subtract cycle was unsuccessful, that is R1−(R0+1) resulted in an overdraft. In count PC14, the value (R0+1) is added back to the remainder in register R1 to restore register R1 to the value it had prior to the unsuccessful subtraction.

If the machine enters count PC14 from count PC13, it was because the second half of the subtract cycle (R1−R0) was unsuccessful. In count PC12, the value in register R1 was restored by the value in register R0. In count PC14, then, this new value in register R1 is again incremented, this time by the value of the first subtrahend of the unsuccessful subtract cycle in phase count PC8.

Therefore, no matter which subtraction was unsuccessful, the value of register R1 is restored to the value it originally had before the unsuccessful cycle was started in count PC8. This value is retained in register R1 and when the machine recycles to initiate a new couplet cycle it is shifted left two columns in phase counts PC3 through PC7 and combines with a new couplet which is placed in the two least significant digit positions in register R1 to form the new minuend for the subtract cycle beginning in phase count PC8. The addition to register R1 of $R0+1$ is accomplished in phase count PC14 in much the same manner as adding register R0 to register R1 in count PC12. The register R0 digit is read from the delay line 26 and counted into the A counter 54. At B15 time of register R0, the reset A signal is again inhibited. To add a one to the contents of the A counter 54, the advance A signal from FIG. 24 is generated. The output of inverter 340 is true when the equation (Square Root·$PC14 \cdot R0 \cdot C2 \cdot B15$) is true, which it is at this time. The A counter 54 is, therefore, advanced one count. If this increment causes the A counter 54 to step from nine to zero, a carry is propagated by causing the Carry-Borrow flip-flop 89 in FIG. 27 to be set as previously described.

The register R1 digit, then, emerges from the delay line 26 and is counted into the A counter 54 resulting in the value in the A counter 54 at the end or register R1 time being, $R1+(R0+1)$. This digit is then shifted to the B counter 56, then to C counter 58, and then back onto the delay line 26. If a carry should be required, due to the addition, the Carry-Borrow flip-flop 89 will be set.

The carry propagated during this addition is added into the addition in the next column in the same manner as described in phase count PC12. Also during count PC14, the R0 register is shifted one column left. This shift is accomplished during the same pass of the data train that the addition described above occurs. In FIG. 19, the OR gate 342 has a false output when the equation. Square Root·$PC14 \cdot R0 \cdot \overline{C0} \cdot \overline{C1} \cdot \overline{C15} \cdot \overline{DPCZ}$, is true. This signal from 342 is inverted true by inverter 244 and causes the Shift A to D and Shift D to B signals to be true in FIG. 22. The signal Shift A to B is also disabled at this time.

The register R0 digit read into the A counter 54 then is shifted into the D counter 60 at B15 time of register R0. The register R0 digit is incremented by one in the A counter 54 and then the register R1 digit is added to it as it emerges from the delay line 26. This sum is then shifted to the B counter 56. The next register R0 time, in the next column, the register R0 digit is counted into the A counter 54 and again shifted to the D counter 60, the digit in the D counter 60, which was the register R0 digit of the preceding column, is then shifted into the B counter 56 occupying the register R0 digit time in that column.

Notice that it is required that the decimal point counter 100 not be zero for the shift left of the R0 register to occur. If the decimal point counter 100 was zero, the shift left would not occur. The decimal point counter 100 would be zero at this time only if all the arithmetic was complete. The decimal point counter 100, it will be recalled, originally was set to a twelve or a fourteen count and counted to zero by shifting all of the digits out of the R2 register into the R1 register to be operated upon. The decimal point counter 100 receives a second setting corresponding to the number of digits right of the decimal point indicated by the setting on the decimal point selection means 112 when the DPS flip-flop 136 is set. The DPS flip-flop 136 will set in count PC12 if the decimal point counter 100 was counted to zero at the end of count PC7, or, it will be set when the phase counter 90 assumes the fourteen count if count PC14 was entered from count PC9, the DPS flip-flop 136, in this latter case, is set at the same time that the phase counter 90 assumes the fourteen count. The decimal point counter 100, therefore, receives its second setting before B15 time of register R0 in column two when the shift A to D would take place. Consequently, the shift left of register R0 is prevented only if the decimal point counter 100 has been counted to zero twice and the value in register R0 is the actual answer derived during all of the couplet cycles.

At the end of the data train during count PC14, the Home flip-flop 32 comes true toggling 1PC flip-flop 92 true. If at this time the output of inverter 344 in FIG. 9 is also true, the 4PC and 8PC flip-flops 96 and 98 will be reset causing the phase counter 90 to assume a PC3 count. The output of inverter 344 will be true when the equation Square Root·$PC14 \cdot \overline{DPCZ}$ is true. Therefore, the phase counter 90 recycles to count PC3 if the decimal point counter 100 is not yet zero, however, if the decimal point counter 100 is zero, 4PC flip-flop 96 and 8PC flip-flop 98 remain one set causing the phase counter 90 to assume the PC15 count.

PHASE COUNT FIFTEEN

The phase count PC15 prepares the data recirculating through the memory loop for display by shifting the R3 and R4 registers down one register and then shifting R0 register containing the answer up one register to the R1 register position. In FIG. 23 the output of OR gate 344 will be false when the equation Square Root·$PC15 \cdot (R3+R4)$ is true. The output of the gate 344 causes the shift A to C output signal of inverter 346 to be true at B15 time of registers R3 and R4 for all columns except C0 and C15. The output of inverter 348 is the complement of the output of inverter 346 and is disabled at these times inhibiting the normal B to C shift. The digits in registers R3 and R4 are, therefore, advanced one register position upon the data train and occupy register positions R2 and R3 respectively. At all other digit times, the normal B to C shift occurs except for the register R0 digit.

In FIG. 19 the output of OR gate 351 will cause the output of inverter 244 to be true when the equation Square Root·$PC15 \cdot R0$ is true. The output of inverter 244, in turn, causes the shift A to D and shift D to B signals to be true and shift A to B false. Therefore, at register R0 time the register R0 digit is transferred from its register R0 position in the A counter 54 to the D counter 60. At register R1 time, the output of OR gate 350 in FIG. 19 causes the output of inverter 244 to be true. The output of inverter 244 is true when the equation Square Root·$PC15 \cdot R1$ is true. The output of inverter 244, again, causes the A to D and D to B shifts to occur resulting in the register R0 digit being transferred from the D counter 60 into the register R1 digit position in the B counter 56.

At the end of the data train, the Home flip-flop 32 comes true. When the flip-flop 32 is set, the calculator 10 "cleans up" the control flip-flops to prepare itself for a new entry. In FIG. 20 AND gate 246 has a true output when the Home flip-flop 32 come true. This output resets the common function flip-flop 224 and also resets the common digit flip-flop 228. When the common digit flip-flop 228 resets, it resets the CFS flip-flop 258. The resetting of the common function flip-flop 224 causes the false side of the flip-flop to transition from false to true, thus, triggering the DPS flip-flop 136 to reset. When both the common function and common digit flip-flops 224 and 228 reset, the output of inverter 214 in FIG. 9 becomes true causing the phase counter 90 to return to the zero count. The square root operation has thus been completed.

It is to be understood that as the term "register" is used herein it refers to a number order or number and does not refer to specific electronic circuitry.

It would also be within the scope of this invention to provide a fourth register which holds the developing square root. In the instance that a fourth register is provided, the number contained in the third register, which is initialy zero, will be incremented first by one and then subsequently by two in each following subtraction with the fourth register being incremented by one for each successful subtraction.

In the event that the result of a subtraction is negative, indicating an overdraft, the contents of the third register are added to the contents of the second register to return said second register to the value it had prior to the overdraft. The contents of the third register are decreased by one, left-shifted one order, and the subtraction then proceeds as above.

From the foregoing it will be apparent that the present invention provides a novel method and apparatus for quickly and simply extracting the square root of an operand. The invention provides for proper decimal alignment of the operand and of the extracted square root. A recording means is included for temporarily recording the cumulative sum of the number of completed entries into the calculator.

Changes may be made in the combination and arrangement of steps and procedures, as well as in the various elements of the apparatus, without departing from the spirit and scope of the following claims.

What is claimed is:

1. A calculator for deriving the square root of an operand comprising:
   storage means arranged in a plurality of registers;
   entry means coupled to said storage means for entering said operand into one of said plurality of registers;
   processing means coupled to said storage means and said entry means for developing in a second of said registers the square root of said aperand, said processing means including:
      means for arranging the contiguous digits of said operand in consecutive pairs; and
      means for performing a plurality of series of successive subtract cycles on a series of partial operands, each said partial operand comprising one of said consecutive pairs of digits and any non-negative remainder from the previously completed series of subtract cycles performed, said performing means including:
         means for arranging said one pair of digits to the right of said any non-negative remainder at the beginning of a series of subtract cycles;
         means for repeatedly subtracting the contents of said second register from said partial operand until a negative remainder results;
         means responsive to the occurrence of a non-negative remainder for incrementing the contents of said second register by a magnitude of one between subtract cycles;
         means responsive to a negative remainder during each of said series of subtract cycles for restoring the initial non-negative remainder existing at the beginning of each subtract cycle;
         means responsive to said restoring means for increasing the subtrahend one order of magnitude between each series of subtract cycles; and
         indicator means responsive to the occurrence of a negative remainder during the last series of subtract cycles for indicating when the last partial operand has been reduced to a negative remainder; and
   display means coupled to said processing means for indicating the value of the subtrahend existing after the completion of the last series of said subtract cycles, said subtrahend comprising the developed square root of said operand.

2. The calculator according to claim 1 wherein said means for incrementing the contents of said second register comprises means for controlling said incrementing in accordance with the series 0, 1, 1, 2, 2, 3 . . .

3. The calculator according to claim 2 wherein said arranging means includes means for shifting the digits from the highest order pair of digit positions in the operand register to the lowest order pair of digit positions in a third register, and means operable concurrently with said shifting means for shifting the contents of said third register and said operand register two digit positions to the left.

4. The calculator according to claim 2 wherein said means for increasing the subtrahend one order of magnitude between each series of subtract cycles comprises means for shifting said subtrahend one digit position to the left.

5. The calculator according to claim 1 wherein said means for incrementing the contents of said second register comprises means for controlling said incrementing in accordance with the series 1, 0, 2, 1, 3, 2 . . .

6. The calculator according to claim 5 wherein said arranging means includes means for shifting the digits from the highest order pair of digit positions in the operand register to the lowest order pair of digit positions in a third register, and means operable concurrently with said shifting means for shifting the contents of said third register and said operand register two digit positions to the left.

7. The calculator according to claim 5 wherein said means for increasing the subtrahend one order of magnitude between each series of subtract cycles comprises means for shifting said subtrahend one digit position to the left.

8. The calculator of claim 1 wherein said processing means includes decimal point means for specifying the number of digit positions desired to the right of the decimal point in said operand and said subtrahend, counting means coupled to said decimal point means adapted to be set to a count configuration representing said number of digit positions, first means coupled to said counting means for incrementing said counting means whenever a digit is entered after said counting means has been set, second means coupled to said counting means for incrementing said counting means by a magnitude of two at the beginning of each said subtract cycle, and means coupled to said entry means and responsive to a zero setting in said counting means for inhibiting further entry of digits after said counting means has been counted to zero from a set configuration.

9. The calculator according to claim 8 wherein said processing means further includes means responsive to a nonzero count configuration in said counting means for entering a plurality of zero digits whenever the number of digits entered after said counting means has been set is less than the number of digit positions specified by said decimal point means.

10. The calculator according to claim 8 wherein said processing means further includes parity means responsive to said decimal point means and coupled to said counting means for setting said counting means to a first predetermined count configuration when the number specified by said decimal point means is even and for setting said counting means to a second predetermined count configuration when the number specified by said decimal point means is odd, and wherein the output of said counting means is further coupled to said indicator means, the occurrence of a zero count configuration after said counting means has been set to either of said predetermined count configurations serving to indicate the last partial operand has been reduced to a negative remainder.

11. The calculator according to claim 10 wherein said arranging means includes register expansion means for temporarily expanding the capacity of said operand register one order of magnitude in response to a setting in said counting means of said first predetermined count configuration, and means to place a zero in the expanded digit position of said operand register so that the most significant pair of digits comprises said zero and the most significant digit of said operand.

12. The calculator according to claim 10 wherein said processing means further includes means responsive to said indicator means for setting said counting means to said count configuration representing said number of digit positions when said last partial operand has been reduced to a negative remainder, and disabling means coupled to said performing means and said counting means for halting the performance of subtract cycles in response to a second zero count configuration in said counting means.

13. The method of deriving the square root of an operand entered into a calculator by a modified sum of the odd integers comprising the following automatically controlled steps within said calculator:
   (a) arranging the contiguous digits of said operand in a plurality of consecutive pairs, said arranging step including the additional step of placing a zero to the left of the most significant digit of said operand when the number of digits to the left of the decimal point is odd,
   (b) reducing the highest order pair of digits to a negative remainder by performing a plurality of subtract cycles with a subtrahend incremented in accordance with the series 1, 0, 2, 1, 3, 2 . . . until a last cycle produces a negative remainder, each said subtract cycle comprising at least a first subtraction, and a second subtraction if said first subtraction produces a non-negative remainder,
   (c) restoring the non-negative remainder existing at the beginning of said last subtract cycle,
   (d) increasing said subtrahend by one order of magnitude,
   (e) forming a partial operand by arranging the next highest order pair of said digits to the right of said non-negative remainder,
   (f) reducing said partial operand to a negative remainder by performing a plurality of subtract cycles with said increased subtrahend, incrementing said increased subtrahend in accordance with the series 1, 0, 2, 1, 3, 2 . . . until a last cycle produces a negative remainder, each said subtract cycle comprising at least a first subtraction, and a second subtraction if said first subtraction produces a non-negative remainder,
   (g) restoring the non-negative remainder existing at the beginning of said last subtract cycle of step (f),
   (h) increasing said subtrahend of step (f) by one order of magnitude,
   (i) forming a partial operand by arranging the next highest order pair of said digits to the right of said non-negative remainder of step (g),
   (j) repeating said steps of (f) reducing, (g) restoring, (h) increasing and (i) forming until the last partial operand has been reduced to a negative remainder, and
   (k) displaying the resulting value of said subtrahend, said value comprising the developed square root of said operand.

14. The method according to claim 13 further including the step of decimally aligning said operand to a predetermined decimal significance before beginning said re-reducing step (b).

15. The method according to claim 13 further including the step of decimally aligning said subtrahend whose resulting value comprises said developed square root of said operand before said displaying step (k).

16. The method of deriving the square root of an operand entered into a calculator by a modified sum of the odd integers comprising the following automatically controlled steps within said calculator:
   (a) arranging the contiguous digits of said operand in a plurality of consecutive pairs, said arranging step including the additional step of placing a zero to the left of the most signficant digit of said operand when the number of digits to the left of the decimal point is odd,
   (b) reducing the highest order pair of digits to a negative remainder by performing a plurality of subtract cycles with a subtrahend incremented in accordance with the series 0, 1, 1, 2, 2, 3 . . . until a last cycle produces a negative remainder, each said subtract cycle comprising at least a first subtraction, and a second subtraction if said first subtraction produces a non-negative remainder,
   (c) restoring the non-negative remainder existing at the beginning of said last subtract cycle,
   (d) increasing said subtrahend by one order of magnitude,
   (e) forming a partial operand by arranging the next highest order pair of said digits to the right of said non-negative remainder,
   (f) reducing said partial operand to a negative remainder by performing a plurality of subtract cycles with said increased subtrahend, incrementing said increased subtrahend in accordance with the series 0, 1, 1, 2, 2, 3 . . . until a last cycle produces a negative remainder, each said subtract cycle comprising at least a first subtraction, and a second subtraction if said first subtraction produces a non-negative remainder,
   (g) restoring the non-negative remainder existing at the beginning of said last subtract cycle of step (f),
   (h) increasing said subtrahend of step (f) by one order of magnitude,
   (i) forming a partial operand by arranging the next highest order pair of digits to the right of said non-negative remainder of step (g),
   (j) repeating said steps of (f) reducing, (g) restoring, (h) increasing and (i) forming until the last partial operand has been reduced to a negative remainder, and
   (k) displaying the resulting value of said subtrahend, said value comprising the developed square root of said operand.

17. The method according to claim 16 further including the step of decimally aligning said operand to a predetermined decimal significance before beginning said reducing step (b).

18. The method according to claim 16 further including the step of decimally aligning said subtrahend whose resulting value comprises said developed square root of said operand before said displaying step (k).

References Cited

UNITED STATES PATENTS

| | | | |
|---|---|---|---|
| 2,817,477 | 12/1957 | Williams | 235—61 |
| 2,912,162 | 11/1959 | Nee | 235—158 |
| 3,280,314 | 10/1966 | Weigler | 235—158 |

MALCOLM A. MORRISON, Primary Examiner

D. H. MALZAHN, Assistant Examiner

PO-1050
(5/69)

UNITED STATES PATENT OFFICE
CERTIFICATE OF CORRECTION

Patent No. 3,526,760        Dated 9/1/70

Inventor(s) Robert A. Ragen

It is certified that error appears in the above-identified patent and that said Letters Patent are hereby corrected as shown below:

Column 1:    line 19,    change "substrac-" to -- subtrac- --;
               line 40,    change "of" to -- on --;
               line 48,    change "deck-top" to -- desk-top --;
               line 54,    change "deck-top" to -- desk-top --;
               line 57,    change "correct" to -- correctly --.

Column 4:    line 19,    after "second" add -- half of the cycle uses this same integer incremented by one. Thus, the first --.

Column 5:    line 27,    change "subtracted" to -- subtract --;
               line 35,    after "therein" insert -- in --.

Column 6:    line 20,    change "utnil" to -- until --.

Column 9:    line 1,    change "puse" to -- pulse --.

Column 11:    line 54,    after "digit" insert -- in --.

Column 12,    line 3,    change "Al" to -- Rl --;
               line 6,    change "The" to -- This --;
               line 48,    after "counter" insert -- 54 --.

Column 13:    line 1,    change "substracted" to -- subtracted --;
               line 50,    change "flip-flip" to -- flip-flop --.

Column 14:    line 1,    change "sequetnially" to -- sequentially --;
               line 10,    change "quare" to -- square --.

Signed and sealed this 8th day of June 1971.

(SEAL)
Attest:

EDWARD M. FLETCHER, JR.                WILLIAM E. SCHUYLER, JR.
Attesting Officer                              Commissioner of Patents